United States Patent
Chin et al.

(10) Patent No.: US 11,923,769 B2
(45) Date of Patent: Mar. 5, 2024

(54) SYSTEM AND METHOD FOR CONTROLLING TOTEM POLE POWER FACTOR CORRECTION CIRCUIT, AND POWER ADAPTER

(71) Applicant: Huawei Digital Power Technologies Co., Ltd., Shenzhen (CN)

(72) Inventors: Ken Chin, Shenzhen (CN); Shanglin Mo, Dongguan (CN); Yuanjun Liu, Shenzhen (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 86 days.

(21) Appl. No.: 17/728,038

(22) Filed: Apr. 25, 2022

(65) Prior Publication Data
US 2022/0345034 A1  Oct. 27, 2022

(30) Foreign Application Priority Data
Apr. 25, 2021 (CN) .......................... 202110449280.4

(51) Int. Cl.
H02M 1/42 (2007.01)
(52) U.S. Cl.
CPC ................................. H02M 1/4233 (2013.01)
(58) Field of Classification Search
CPC .................................................. H02M 1/4233
See application file for complete search history.

(56) References Cited

U.S. PATENT DOCUMENTS

| 10,432,086 B1* | 10/2019 | Kamath .................. H02M 7/12 |
| 2017/0070157 A1* | 3/2017 | Tsukii .................. H02M 1/4225 |
| 2019/0312507 A1* | 10/2019 | Kamath .............. H02M 1/4233 |
| 2022/0255415 A1* | 8/2022 | Ishibashi ............. H02M 1/0025 |
| 2022/0311351 A1* | 9/2022 | Kim ...................... H02M 7/219 |

FOREIGN PATENT DOCUMENTS

| CN | 106602900 A | 4/2017 |
| CN | 108736702 A | 11/2018 |
| CN | 111224564 A | 6/2020 |
| CN | 112189301 A | 1/2021 |
| CN | 112366935 A | 2/2021 |
| JP | 2014090544 A | 5/2014 |
| WO | 2016177118 A1 | 11/2016 |
| WO | 2020159640 A1 | 8/2020 |
| WO | 2020183553 A1 | 9/2020 |

* cited by examiner

*Primary Examiner* — Jue Zhang
*Assistant Examiner* — Lakaisha Jackson
(74) *Attorney, Agent, or Firm* — Maier & Maier, PLLC

(57) ABSTRACT

The control system includes a PFC circuit and a sampling control circuit, and the PFC circuit includes an inductor, a first power supply drive circuit, and a first bridge arm and a second bridge arm that are connected in parallel, and a first bridge arm midpoint is a serial connection point between a first upper bridge arm and a first lower bridge arm of the first bridge arm. The sampling control circuit is configured to control, based on voltages of two ends of an alternating current power supply, the first lower bridge arm to be turned on, so that the first power supply drive circuit starts charging. The sampling control circuit is further configured to: when charging duration of the first power supply drive circuit reaches first target duration, control the first lower bridge arm to be turned off, so that the first power supply drive circuit completes charging.

20 Claims, 11 Drawing Sheets

SYSTEM AND METHOD FOR CONTROLLING TOTEM POLE POWER FACTOR CORRECTION CIRCUIT, AND POWER ADAPTER

CROSS-REFERENCE TO RELATED APPLICATIONS

This application claims priority to Chinese Patent Application No. 202110449280.4, filed on Apr. 25, 2021, which is hereby incorporated by reference in its entirety.

TECHNICAL FIELD

The embodiments relate to the field of power electronics technologies, and in particular, to a system and method for controlling a totem pole power factor correction circuit, and a power adapter.

BACKGROUND

When a circuit with a half-bridge structure is in a normal working state, a voltage of a connection point between an upper-end switching transistor (namely, an upper transistor) and a lower-end switching transistor (namely, a lower transistor), namely, a bridge arm midpoint changes, which causes a floating voltage to ground in upper transistor power supply. To ensure normal working of the upper transistor, a working voltage may be supplied to the upper transistor in a manner such as bootstrap power supply. In the bootstrap power supply manner, a bootstrap circuit is charged when a lower transistor is turned on, and a bootstrap capacitor supplies power to an upper transistor when the lower transistor is turned off. Usually, when a totem pole power factor correction (PFC) circuit starts or re-starts, a bootstrap capacitor needs to be precharged. However, in some cases, when a PFC circuit starts or re-starts, a bootstrap capacitor cannot be charged (for example, there is a residual voltage at an output end connected to a load, or a parasitic diode of a lower transistor is in a reverse cut-off state), and consequently, an upper transistor cannot normally work.

For a totem pole PFC circuit that uses the bootstrap power supply manner, when a bootstrap capacitor may be unable to be charged, in the conventional technology, a lower-end transistor of the circuit is enabled, in a standby state, to persistently work. In this case, a voltage of the bootstrap capacitor may be always kept in a proper working range. Before the circuit restarts, the bootstrap capacitor does not need to be precharged. However, in the conventional technology, still keeping, in the standby state, the lower-end transistor persistently working causes an additional energy loss, and also increases a component loss. Therefore, in addition to reducing system energy utilization efficiency, a service life of a circuit element is reduced, and a circuit application scenario is limited.

SUMMARY

A system and method for controlling a totem pole power factor correction circuit, and a power adapter, may precharge a power supply drive circuit in a PFC circuit when a sampling control circuit determines that values of voltages of two ends of an alternating current power supply meet a precharging condition of the power supply drive circuit, to reduce an electric energy loss in a process of charging the power supply drive circuit, thereby improving electric energy utilization, and prolonging a service life of a circuit element.

According to a first aspect, a system may control a totem pole power factor correction circuit. The control system includes a power factor correction (PFC) circuit and a sampling control circuit, and the PFC circuit includes an inductor, a first power supply drive circuit, and a first bridge arm and a second bridge arm that are connected in parallel. A first parallel connection point between the first bridge arm and the second bridge arm is connected to a load, a second parallel connection point between the first bridge arm and the second bridge arm is grounded, a first bridge arm midpoint of the first bridge arm is connected to a first connection end of an alternating current power supply by using the inductor, a second connection end of the alternating current power supply is connected to a second bridge arm midpoint of the second bridge arm, the first bridge arm midpoint is a serial connection point between a first upper bridge arm and a first lower bridge arm of the first bridge arm, one end of the sampling control circuit is connected to the alternating current power supply, the other end of the sampling control circuit is connected to the first lower bridge arm, a first connection end of the first power supply drive circuit is connected to the first upper bridge arm, and a second connection end of the first power supply drive circuit is connected to the first bridge arm midpoint. Herein, the first upper bridge arm and the first lower bridge arm may be switching elements with a switching function, such as metal-oxide-semiconductor field-effect transistors (MOSFET), high electron mobility field effect transistors (HEMT), or insulated gate bipolar transistors (IGBT). The switching element may be turned on when an access voltage reaches an on-state voltage of the switching element or may be turned off when an access voltage of an input end is less than the on-state voltage of the switching element. Herein, the second bridge arm may be a half-bridge circuit including two transistors (for example, diodes) connected in series.

The sampling control circuit may be configured to control, based on voltages of the two ends of the alternating current power supply, the first lower bridge arm to be turned on, so that the first power supply drive circuit starts charging. Herein, because the first lower bridge arm is turned on and grounded, the first lower bridge arm and the first power supply drive circuit form a path, so that bootstrap charging of the first power supply drive circuit can be implemented.

The sampling control circuit may be further configured to: when charging duration of the first power supply drive circuit reaches first target duration, control the first lower bridge arm to be turned off, so that the first power supply drive circuit completes charging. Herein, when the charging duration of the first power supply drive circuit reaches the first target duration, it may be considered that the first power supply drive circuit completes charging.

In the implementation, when the sampling control circuit determines that values of the voltages of the two ends of the alternating current power supply meet a precharging condition of the first power supply drive circuit, the sampling control circuit may control the first lower bridge arm to be turned on. In this case, because the first lower bridge arm is turned on and grounded, the first lower bridge arm and the first power supply drive circuit form a path, so that bootstrap charging of the first power supply drive circuit can be implemented. When the charging duration of the first power supply drive circuit reaches the first target duration, the sampling control circuit may control the first lower bridge arm to be turned off and may determine (or consider) that the first power supply drive circuit completes charging. The first power supply drive circuit in the PFC circuit may be precharged when the sampling control circuit determines that the values of the voltages of the two ends of the alternating current power supply meet the precharging condition of the first power supply drive circuit, to reduce an electric energy loss in a process of charging the first power supply drive circuit, thereby improving electric energy utilization, and prolonging a service life of a circuit element.

With reference to the first aspect, in a first possible implementation, the sampling control circuit may be configured to: when a voltage of the first connection end of the alternating current power supply is less than a voltage of the second connection end of the alternating current power supply, control the first lower bridge arm to be turned on, so that the first power supply drive circuit starts charging. It may be understood that when the sampling control circuit determines that the voltage of the first connection end of the alternating current power supply is less than the voltage of the second connection end of the alternating current power supply, the sampling control circuit may control the first lower bridge arm to be turned on. In the implementation, the sampling control circuit may compare a value of the voltage of the first connection end of the alternating current power supply with a value of the voltage of the second connection end of the alternating current power supply, to simply determine when to start to turn on the first lower bridge arm, so that the first power supply drive circuit starts charging. The operation is simple, and applicability is strong, so that electric energy utilization can be further improved, and a service life of a circuit element can be further prolonged.

With reference to the first possible implementation of the first aspect, in a second possible implementation, the sampling control circuit may be further configured to: when the voltage of the first connection end of the alternating current power supply changes from being less than the voltage of the second connection end of the alternating current power supply to being greater than or equal to the voltage of the second connection end of the alternating current power supply, and the charging time of the first power supply drive circuit is less than the first target duration, control the first lower bridge arm to be turned off; and when the voltage of the first connection end of the alternating current power supply changes from being greater than or equal to the voltage of the second connection end of the alternating current power supply to being less than the voltage of the second connection end of the alternating current power supply, control the first lower bridge arm to be turned on, so that the charging time of the first power supply drive circuit reaches the first target duration. Herein, when the sampling circuit determines that the voltage of the first connection end of the alternating current power supply is less than the voltage of the second connection end of the alternating current power supply, the sampling control circuit may control the first lower bridge arm to be turned on, so that the first power supply drive circuit starts charging. It may be understood that, from a moment at which the first power supply drive circuit starts charging to a moment at which the voltage of the first connection end of the alternating current power supply changes to being greater than or equal to the voltage of the second connection end of the alternating current power supply, the charging duration of the first power supply drive circuit may be less than the first target duration, that is, the first power supply drive circuit does not complete charging. The sampling control circuit may first control the first lower bridge arm to be turned off; and when the voltage of the first connection end of the alternating current power supply changes from being greater than or equal to the voltage of the second connection end of the alternating current power supply to being less than the voltage of the second connection end of the alternating current power supply (that is, when a charging start condition of the first power supply drive circuit is met again), control the first lower bridge arm to be turned on, so that the charging time of the first power supply drive circuit reaches the first target duration.

In the implementation, when the voltages of the two ends of the alternating current power supply do not meet a charging condition of the first power supply drive circuit (that is, the voltage of the first connection end of the alternating current power supply changes from being less than the voltage of the second connection end of the alternating current power supply to being greater than or equal to the voltage of the second connection end of the alternating current power supply), and the first power supply drive circuit does not complete charging, the sampling control circuit may control the first lower bridge arm to be turned off; and when the voltages of the two ends of the alternating current power supply meet the charging condition of the first power supply drive circuit again (that is, the voltage of the first connection end of the alternating current power supply changes from being greater than or equal to the voltage of the second connection end of the alternating current power supply to being less than the voltage of the second connection end of the alternating current power supply), control the first lower bridge arm to be turned on, so that the charging time of the first power supply drive circuit reaches the first target duration (in other words, the first power supply drive circuit completes charging). The operation is simple, and applicability is strong, so that on a basis of ensuring that the first power supply drive circuit completes charging, electric energy utilization can be further improved, and a service life of a circuit element can be further prolonged.

With reference to the first aspect, the first possible implementation of the first aspect, or the second possible implementation of the first aspect, in a third possible implementation, the other end of the sampling control circuit is further connected to the first power supply drive circuit; and the sampling control circuit may be further configured to: after the first power supply drive circuit completes charging, control the first power supply drive circuit to turn on the first upper bridge arm. Herein, the sampling control circuit controls the first power supply drive circuit to turn on the first upper bridge arm, so that a circuit design in the control system is simplified. The operation is simple, and applicability is strong.

With reference to any one of the first aspect or the first possible implementation of the first aspect to the third possible implementation of the first aspect, in a fourth possible implementation, the PFC circuit further includes a second power supply drive circuit, the second bridge arm includes a second upper bridge arm and a second lower bridge arm, the second bridge arm midpoint is a serial connection point between the second upper bridge arm and the second lower bridge arm of the second bridge arm, the other end of the sampling control circuit is connected to the second lower bridge arm, a first connection end of the second power supply drive circuit is connected to the second upper bridge arm, and a second connection end of the second power supply drive circuit is connected to the second bridge arm midpoint. Herein, the second upper bridge arm and the second lower bridge arm may be switching elements with a switching function, such as MOSFETs, HEMTs, or IGBTs. The switching element may be turned on when an access voltage reaches an on-state voltage of the switching element or may be turned off when an access voltage of an input end is less than the on-state voltage of the switching element.

The sampling control circuit may be further configured to control, based on the voltages of the two ends of the alternating current power supply, the second lower bridge arm to be turned on, so that the second power supply drive circuit starts charging. Herein, because the second lower bridge arm is turned on and grounded, the second lower bridge arm and the second power supply drive circuit form a path, so that bootstrap charging of the second power supply drive circuit can be implemented.

The sampling control circuit may be further configured to: when charging duration of the second power supply drive circuit reaches second target duration, control the second lower bridge arm to be turned off, so that the second power supply drive circuit completes charging. Herein, when the charging duration of the second power supply drive circuit reaches the second target duration, it may be considered that the second power supply drive circuit completes charging.

In the implementation, when the sampling control circuit determines that values of the voltages of the two ends of the alternating current power supply meet a precharging condition of the second power supply drive circuit, the sampling control circuit may control the second lower bridge arm to be turned on. In this case, because the second lower bridge arm is turned on and grounded, the second lower bridge arm and the second power supply drive circuit form a path, so that bootstrap charging of the second power supply drive circuit can be implemented. When the charging duration of the second power supply drive circuit reaches the second target duration, the sampling control circuit may control the second lower bridge arm to be turned off and may determine (or consider) that the second power supply drive circuit completes charging. The power supply drive circuit in the PFC circuit may be precharged when the sampling control circuit determines that the values of the voltages of the two ends of the alternating current power supply meet the precharging condition of the second power supply drive circuit, to reduce an electric energy loss in a process of charging the second power supply drive circuit, thereby improving electric energy utilization, and prolonging a service life of a circuit element.

With reference to the fourth possible implementation of the first aspect, in a fifth possible implementation, the sampling control circuit may be further configured to: when the voltage of the first connection end of the alternating current power supply is greater than the voltage of the second connection end of the alternating current power supply, control the second lower bridge arm to be turned on, so that the second power supply drive circuit starts charging. It may be understood that when the sampling control circuit determines that the voltage of the first connection end of the alternating current power supply is greater than the voltage of the second connection end of the alternating current power supply, the sampling control circuit may control the second lower bridge arm to be turned on. In the implementation, the sampling control circuit may compare a value of the voltage of the first connection end of the alternating current power supply with a value of the voltage of the second connection end of the alternating current power supply, to simply determine when to start to turn on the second lower bridge arm, so that the second power supply drive circuit starts charging. The operation is simple, and applicability is strong, so that electric energy utilization can be further improved, and a service life of a circuit element can be further prolonged.

With reference to the fifth possible implementation of the first aspect, in a sixth possible implementation, the sampling control circuit may be further configured to: when the voltage of the first connection end of the alternating current power supply changes from being greater than the voltage of the second connection end of the alternating current power supply to being less than or equal to the voltage of the second connection end of the alternating current power supply, and the charging time of the second power supply drive circuit is less than the second target duration, control the second lower bridge arm to be turned off; and when the voltage of the first connection end of the alternating current power supply changes from being less than or equal to the voltage of the second connection end of the alternating current power supply to being greater than the voltage of the second connection end of the alternating current power supply, control the second lower bridge arm to be turned on, so that the charging time of the second power supply drive circuit reaches the second target duration. Herein, when the sampling circuit determines that the voltage of the first connection end of the alternating current power supply is greater than the voltage of the second connection end of the alternating current power supply, the sampling control circuit may control the second lower bridge arm to be turned on, so that the second power supply drive circuit starts charging. It may be understood that, from a moment at which the second power supply drive circuit starts charging to a moment at which the voltage of the first connection end of the alternating current power supply changes to being less than or equal to the voltage of the second connection end of the alternating current power supply, the charging duration of the second power supply drive circuit may be less than the second target duration, that is, the second power supply drive circuit does not complete charging. The sampling control circuit may first control the second lower bridge arm to be turned off; and when the voltage of the first connection end of the alternating current power supply changes from being less than or equal to the voltage of the second connection end of the alternating current power supply to being greater than the voltage of the second connection end of the alternating current power supply (that is, when a charging start condition of the second power supply drive circuit is met again), control the second lower bridge arm to be turned on, so that the charging time of the second power supply drive circuit reaches the second target duration.

In the implementation, when the voltages of the two ends of the alternating current power supply do not meet a charging condition of the second power supply drive circuit (that is, the voltage of the first connection end of the alternating current power supply changes from being greater than the voltage of the second connection end of the alternating current power supply to being less than or equal to the voltage of the second connection end of the alternating current power supply), and the second power supply drive circuit does not complete charging, the sampling control circuit may control the second lower bridge arm to be turned off; and when the voltages of the two ends of the alternating current power supply meet the charging condition of the second power supply drive circuit again (that is, the voltage of the first connection end of the alternating current power supply changes from being less than or equal to the voltage of the second connection end of the alternating current power supply to being greater than the voltage of the second connection end of the alternating current power supply), control the second lower bridge arm to be turned on, so that the charging time of the second power supply drive circuit reaches the second target duration (in other words, the second power supply drive circuit completes charging). The operation is simple, and applicability is strong, so that on a basis of ensuring that the second power supply drive circuit completes charging, electric energy utilization can be further improved, and a service life of a circuit element can be further prolonged.

With reference to any one of the fourth possible implementation of the first aspect to the sixth possible implementation of the first aspect, in a seventh possible implementation, the other end of the sampling control circuit is further connected to the second power supply drive circuit; and the sampling control circuit may be further configured to: after the second power supply drive circuit completes charging, control the second power supply drive circuit to turn on the second upper bridge arm. Herein, the sampling control circuit controls the second power supply drive circuit to turn on the second upper bridge arm, so that a circuit design in the control system is simplified. The operation is simple, and applicability is strong.

With reference to any one of the first aspect or the first possible implementation of the first aspect to the seventh possible implementation of the first aspect, in an eighth possible implementation, each of the first power supply drive circuit and/or the second power supply drive circuit is a bootstrap power supply drive circuit, and the bootstrap power supply drive circuit includes a bootstrap capacitor, a bootstrap diode, and a drive circuit. One end of the bootstrap capacitor is separately connected to an output end of the bootstrap diode and a first connection end of the drive circuit, the other end of the bootstrap capacitor is separately connected to a second connection end of the drive circuit and a bridge arm midpoint, an input end of the bootstrap diode is connected to a power supply (that may be an external power supply or an internal power supply), a third connection end of the drive circuit is connected to the sampling control circuit, and a fourth connection end of the drive circuit is connected to an upper bridge arm.

The power supply may be configured to: when the sampling control circuit controls a lower bridge arm connected to the upper bridge arm in series to be turned on, charge the bootstrap capacitor to implement charging of the power supply drive circuit. The sampling control circuit may be further configured to: when charging duration of the bootstrap capacitor reaches target duration, control the lower bridge arm to be turned off to complete charging of the power supply drive circuit, where the target duration is the first target duration or the second target duration. The sampling control circuit may be further configured to: after the power supply drive circuit completes charging, control the power supply drive circuit to turn on the upper bridge arm. Herein, to protect an electronic element in the control system, a current-limiting resistor may be connected between the power supply and the bootstrap capacitor. When the sampling control circuit controls the lower bridge arm connected to the upper bridge arm in series to be turned on, the power supply, a target power supply drive circuit (namely, a power supply drive circuit connected to the lower bridge arm that is turned on), and the lower bridge arm that is turned on form a path, so that the bootstrap capacitor can be charged by using the power supply. When the power supply drive circuit (namely, a bootstrap charging element (namely, the bootstrap capacitor) in the power supply drive circuit) completes charging, the power supply drive circuit may generate, based on a drive control signal that is output by the sampling control circuit, a drive voltage greater than or equal to an on-state voltage of the upper bridge arm, to turn on the upper bridge arm. Herein, the target duration may be obtained through calculation by using a voltage of the power supply, a value of the bootstrap capacitor, the charging current-limiting resistor, and a drive voltage (namely, a voltage, between the first connection end of the drive circuit and the second connection end of the drive circuit, obtained when the fourth connection end of the drive circuit outputs a voltage for turning on the upper bridge arm) of the drive circuit.

In the implementation, when the sampling control circuit controls the lower bridge arm connected to the upper bridge arm in series to be turned on, the control system may charge the bootstrap capacitor by using the power supply, to implement charging of the power supply drive circuit. The sampling control circuit may further determine whether the charging duration of the bootstrap capacitor reaches the target duration, to simply determine whether the power supply drive circuit completes charging, and then when the power supply drive circuit completes charging, control the lower bridge arm to be turned off to complete bootstrap charging, thereby simplifying an operation of determining that the power supply drive circuit completes charging, and improving working efficiency and working performance of the control system. In addition, the sampling control circuit controls the power supply drive circuit to turn on the upper bridge arm, so that a circuit design in the control system is simplified. The operation is simple, and applicability is strong.

With reference to the eighth possible implementation of the first aspect, in a ninth possible implementation, the PFC circuit further includes a third power supply drive circuit, one end of the third power supply drive circuit is connected to the sampling control circuit, and the other end of the third power supply drive circuit is connected to the first lower bridge arm or the second lower bridge arm.

The sampling control circuit may be configured to control, based on the voltages of the two ends of the alternating current power supply, the third power supply drive circuit to turn on the first lower bridge arm or the second lower bridge arm. Herein, to simplify composition of the sampling control circuit, the third power supply drive circuit may be disposed between the sampling drive circuit and the lower bridge arm. The sampling control circuit may control the third power supply drive circuit to turn on the first lower bridge arm or the second lower bridge arm. In the implementation, an output voltage of the sampling control circuit may be lower than an on-state voltage of the first lower bridge arm or the second lower bridge arm, and the third power supply drive circuit outputs the on-state voltage enough to turn on the first lower bridge arm or the second lower bridge arm. Herein, the third power supply drive circuit may be a circuit configured to drive the lower bridge arm in the PFC circuit, thereby simplifying a circuit structure of the sampling control circuit, reducing complexity of the control system, and improving applicability of the control system.

With reference to the ninth possible implementation of the first aspect, in a tenth possible implementation, the sampling control circuit includes a signal processing circuit and a control circuit. One end of the signal processing circuit is used as one end of the sampling control circuit to be separately connected to the first connection end of the alternating current power supply and the second connection end of the alternating current power supply, the other end of the signal processing circuit is connected to the control circuit, and the other end of the control circuit is used as an output of the sampling control circuit to be connected to a power supply drive circuit.

The signal processing circuit may be configured to: collect the voltages of the two ends of the alternating current power supply and generate corresponding drive determining signals based on the voltages of the two ends of the alternating current power supply. The control circuit may be configured to: generate drive control signals based on the drive determining signals, and control, by using the drive control signals, the power supply drive circuit to turn on and/or turn off a corresponding bridge arm, where the power supply drive circuit includes the first power supply drive circuit, the second power supply drive circuit, and/or the third power supply drive circuit. Herein, the signal processing circuit may detect the voltages of the two ends of the alternating current power supply. When the control system is in a pre-start state (for example, the load accesses the control system, a standby level in the control system is lowered, or a pre-start signal is detected before the PFC circuit normally supplies power to the load), the signal processing circuit may determine values of the voltages of the two ends of the alternating current power supply. The signal processing circuit may output the corresponding drive determining signals by determining the values of the voltages of the two ends of the alternating current power supply. For example, when determining that the voltage of the first connection end of the alternating current power supply is less than the voltage of the second connection end of the alternating current power supply, the signal processing circuit may output corresponding drive determining signals (for example, high-level NAC and low-level PAC); or when determining that the voltage of the first connection end of the alternating current power supply is greater than the voltage of the second connection end of the alternating current power supply, the signal processing circuit may output corresponding drive determining signals (for example, low-level NAC and high-level PAC). Herein, the control circuit may generate the drive control signals based on the drive determining signals, and control, by using the drive control signals, the power supply drive circuit to turn on and/or turn off the corresponding bridge arm. For example, when a high-level (or low-level) drive control signal PWM_IN1 is output, the first upper bridge arm is turned on (or turned off); when a high-level (or low-level) drive control signal PWM_IN2 is output, the first lower bridge arm is turned on (or turned off); when a high-level (or low-level) drive control signal PWM_IN3 is output, the second upper bridge arm is turned on (or turned off); or when a high-level (or low-level) drive control signal PWM_IN4 is output, the second lower bridge arm is turned on (or turned off).

In the implementation, the sampling control circuit collects and determines the voltages of the two ends of the alternating current power supply by using the signal processing circuit, and outputs the corresponding drive determining signals. The control circuit may generate the drive control signals based on the drive determining signals, and control, by using the drive control signals, the power supply drive circuit to turn on and/or turn off the corresponding bridge arm. Therefore, a circuit structure of the control system is further simplified, complexity of the control system is further reduced, and applicability of the control system is further improved.

According to a second aspect, a method may control a totem pole power factor correction circuit. The control method is applicable to the sampling control circuit according to any one of the first aspect or the possible implementations of the first aspect. The method includes: the sampling control circuit may control, based on voltages of two ends of an alternating current power supply, a first lower bridge arm to be turned on, so that a first power supply drive circuit starts charging; and when charging duration of the first power supply drive circuit reaches first target duration, the sampling control circuit may control the first lower bridge arm to be turned off, so that the first power supply drive circuit completes charging.

In the implementation, the first power supply drive circuit is precharged when the sampling control circuit detects that values of the voltages of the two ends of the alternating current power supply meet a precharging condition of the first power supply drive circuit, to reduce an electric energy loss in a process of charging the first power supply drive circuit, thereby improving electric energy utilization, and prolonging a service life of a circuit element.

With reference to the second aspect, in a first possible implementation, that the sampling control circuit controls, based on voltages of two ends of an alternating current power supply, a first lower bridge arm to be turned on includes: the sampling control circuit detects a voltage of a first connection end of the alternating current power supply and a voltage of a second connection end of the alternating current power supply; and when detecting that the voltage of the first connection end of the alternating current power supply is less than the voltage of the second connection end of the alternating current power supply, the sampling control circuit may control the first lower bridge arm to be turned on, so that the first power supply drive circuit starts charging. In the implementation, the sampling control circuit may compare a value of the voltage of the first connection end of the alternating current power supply with a value of the voltage of the second connection end of the alternating current power supply, to simply determine when to start to control the first lower bridge arm to be turned on, so that the first power supply drive circuit starts charging. The operation is simple, and applicability is strong, so that electric energy utilization can be further improved, and a service life of a circuit element can be further prolonged.

With reference to the first possible implementation of the second aspect, in a second possible implementation, after the sampling control circuit controls the first lower bridge arm to be turned on, the method further includes: when detecting that the voltage of the first connection end of the alternating current power supply changes from being less than the voltage of the second connection end of the alternating current power supply to being greater than or equal to the voltage of the second connection end of the alternating current power supply, and the charging time of the first power supply drive circuit is less than the first target duration, the sampling control circuit may control the first lower bridge arm to be turned off; and when detecting that the voltage of the first connection end of the alternating current power supply changes from being greater than or equal to the voltage of the second connection end of the alternating current power supply to being less than the voltage of the second connection end of the alternating current power supply, control the first lower bridge arm to be turned on, so that the charging time of the first power supply drive circuit reaches the first target duration. In the implementation, on a basis of ensuring that the first power supply drive circuit completes charging, the sampling control circuit can further improve electric energy utilization and prolong a service life of a circuit element.

With reference to the second aspect, the first possible implementation of the second aspect, or the second possible implementation of the second aspect, in a third possible implementation, the method further includes: the sampling control circuit may control, based on the voltages of the two ends of the alternating current power supply, a second lower bridge arm to be turned on, so that a second power supply drive circuit starts charging; and when charging duration of the second power supply drive circuit reaches second target duration, the sampling control circuit may control the second lower bridge arm to be turned off. In the implementation, when detecting that values of the voltages of the two ends of the alternating current power supply meet a pre-charging condition of the second power supply drive circuit, the sampling control circuit may control the second power supply drive circuit to be precharged, to reduce an electric energy loss in a process of charging the second power supply drive circuit, thereby improving electric energy utilization, and prolonging a service life of a circuit element.

With reference to the second aspect, the first possible implementation of the second aspect, or the second possible implementation of the second aspect, in a third possible implementation, after the first power supply drive circuit completes charging, the sampling control circuit may further control the first power supply drive circuit to turn on a first upper bridge arm. Herein, the sampling control circuit controls the first power supply drive circuit to turn on the first upper bridge arm, so that a circuit design in the control system is simplified. The operation is simple, and applicability is strong.

With reference to the fourth possible implementation of the second aspect, in a fifth possible implementation, that the sampling control circuit controls, based on the voltages of the two ends of the alternating current power supply, a second lower bridge arm to be turned on includes: when detecting that the voltage of the first connection end of the alternating current power supply is greater than the voltage of the second connection end of the alternating current power supply, the sampling control circuit may control the second lower bridge arm to be turned on, so that the second power supply drive circuit starts charging. In the implementation, the sampling control circuit may compare a value of the voltage of the first connection end of the alternating current power supply with a value of the voltage of the second connection end of the alternating current power supply, to simply determine when to start to turn on the second lower bridge arm, so that the second power supply drive circuit starts charging. The operation is simple, and applicability is strong, so that electric energy utilization can be further improved, and a service life of a circuit element can be further prolonged.

With reference to the fifth possible implementation of the second aspect, in a sixth possible implementation, after the sampling control circuit controls the second lower bridge arm to be turned on, so that the second power supply drive circuit starts charging, the method further includes: when detecting that the voltage of the first connection end of the alternating current power supply changes from being greater than the voltage of the second connection end of the alternating current power supply to being less than or equal to the voltage of the second connection end of the alternating current power supply, and the charging time of the second power supply drive circuit is less than the second target duration, the sampling control circuit may control the second lower bridge arm to be turned off; and when detecting that the voltage of the first connection end of the alternating current power supply changes from being less than or equal to the voltage of the second connection end of the alternating current power supply to being greater than the voltage of the second connection end of the alternating current power supply, control the second lower bridge arm to be turned on, so that the charging time of the second power supply drive circuit reaches the second target duration. In the implementation, on a basis of ensuring that the second power supply drive circuit completes charging, the sampling control circuit can further improve electric energy utilization and prolong a service life of a circuit element.

With reference to any one of the second aspect or the first possible implementation of the second aspect to the sixth possible implementation of the second aspect, in a seventh possible implementation, after the second power supply drive circuit completes charging, the sampling control circuit may further control the second power supply drive circuit to turn on a second upper bridge arm. Herein, the sampling control circuit controls the second power supply drive circuit to turn on the second upper bridge arm, so that a circuit design in the control system is simplified. The operation is simple, and applicability is strong.

With reference to any one of the second aspect or the first possible implementation of the second aspect to the seventh possible implementation of the second aspect, in an eighth possible implementation, the method further includes: the sampling control circuit may collect the voltages of the two ends of the alternating current power supply by using a signal processing circuit, and generate corresponding drive determining signals based on the voltages of the two ends of the alternating current power supply; and the sampling control circuit may generate drive control signals based on the drive determining signals by using a control circuit, and control, by using the drive control signals, a power supply drive circuit to turn on and/or turn off a corresponding bridge arm, where the power supply drive circuit includes the first power supply drive circuit, the second power supply drive circuit, and/or a third power supply drive circuit. In the implementation, a circuit structure of the control system can be further simplified, complexity of the control system can be further reduced, and applicability of the control system can be further improved.

According to a third aspect, a power adapter may include a direct current (DC) DC-DC converter and the control system provided in any one of the first aspect to the eighth possible implementation of the first aspect. An input end of the control system is connected to an alternating current power supply, and an output end of the control system is connected to an output end of the power adapter by using the DC-DC converter.

In the implementation, the power adapter may precharge a power supply drive circuit when a sampling control circuit in the control system detects that values of voltages of two ends of the alternating current power supply meet a precharging condition of the power supply drive circuit in the control system, so that during working, the control system can convert a voltage of the alternating current power supply into a direct current voltage and output the direct current voltage to the DC-DC converter, thereby improving electric energy utilization, and prolonging a service life of a circuit element.

DETAILED DESCRIPTION OF THE EMBODIMENTS

A control system and method, and a power adapter are applicable to different types of electrical devices (such as a power grid, a household device, or industrial and commercial electrical devices), may be applied to an electrical device field such as a user terminal (such as a mobile phone, an intelligent device, or a television) field or an automobile field, and may be adapted to different application scenarios such as a power supply scenario of a large electrical device (such as a power grid or an industrial device), a power supply scenario of a small-/medium-sized distributed electrical device (such as a vehicle-mounted electrical device or household electrical device), and a power supply scenario of a mobile electrical device (such as a mobile phone or an intelligent device). The following uses a power supply scenario of the household electrical device as an example for description, and details are not described below again.

Figure 1:
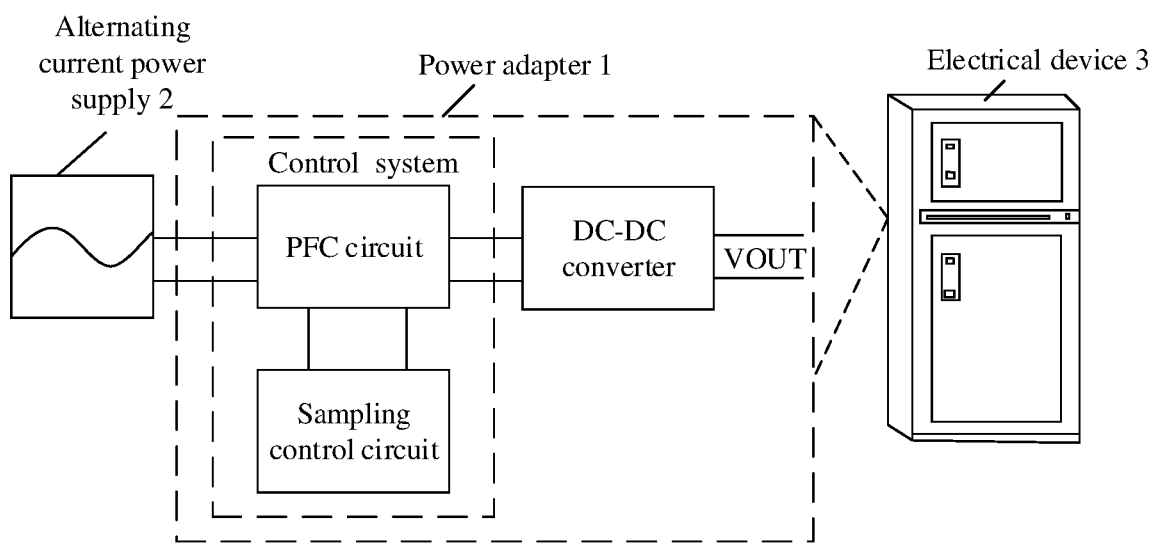
FIG. 1 is a schematic diagram of an application scenario of a control system according to an embodiment.

Refer to FIG. 1 together. FIG. 1 is a schematic diagram of an application scenario of a control system according to an embodiment. As shown in FIG. 1, an alternating current power supply 2 is connected to an electrical device 3 (namely, a load) by using a power adapter 1, and the power adapter 1 may convert an alternating current voltage provided by the alternating current power supply 2 into a direct current voltage and provide the direct current voltage for the electrical device 3. The power adapter 1 includes a control system and a DC-DC converter. The control system may convert the alternating current voltage provided by the alternating current power supply 2 into a to-be-adapted direct current voltage (for example, a direct current voltage of about 400 V), and output the to-be-adapted direct current voltage to the DC-DC converter. The DC-DC converter converts the to-be-adapted direct current voltage into a target direct current voltage (for example, a rated voltage of the electrical device 3) that matches the electrical device 3, so that the electrical device 3 can normally work. The control system includes a PFC circuit and a sampling control circuit. The PFC circuit includes a power supply drive circuit, and a first bridge arm and a second bridge arm that are connected in parallel. The first bridge arm and the second bridge arm include a first upper bridge arm and/or a second upper bridge arm. One upper bridge arm is connected to the sampling control circuit by using one power supply drive circuit. When the electrical device 3 accesses the alternating current power supply 2 by using the power adapter 1, or the electrical device 3 changes from a standby state to a start state, the control system converts from a standby state into a pre-start state, and the sampling control circuit may enable the power supply drive circuit in the PFC circuit to perform bootstrap charging, to implement bootstrap charging of the control system. Therefore, when the PFC circuit normally works, the power supply drive circuit can provide an on-state voltage for an upper bridge arm (namely, the first upper bridge arm and/or the second upper bridge arm), so that the upper bridge arm normally works, and then the power adapter 1 can convert power of the alternating current power supply 2 into a direct current to supply power to the electrical device 3.

The control system may include the PFC circuit and the sampling control circuit. The control system is applicable to a scenario of controlling a circuit that needs to perform bootstrap charging, such as a topology structure of a totem pole PFC circuit, another PFC circuit, or a topology structure of another PFC circuit. For ease of description, a scenario of controlling the totem pole PFC circuit is used as an example to describe the control system. The following provides example descriptions of the control system and a working principle of the control system with reference to FIG. 2 to FIG. 9b.

Figure 2:
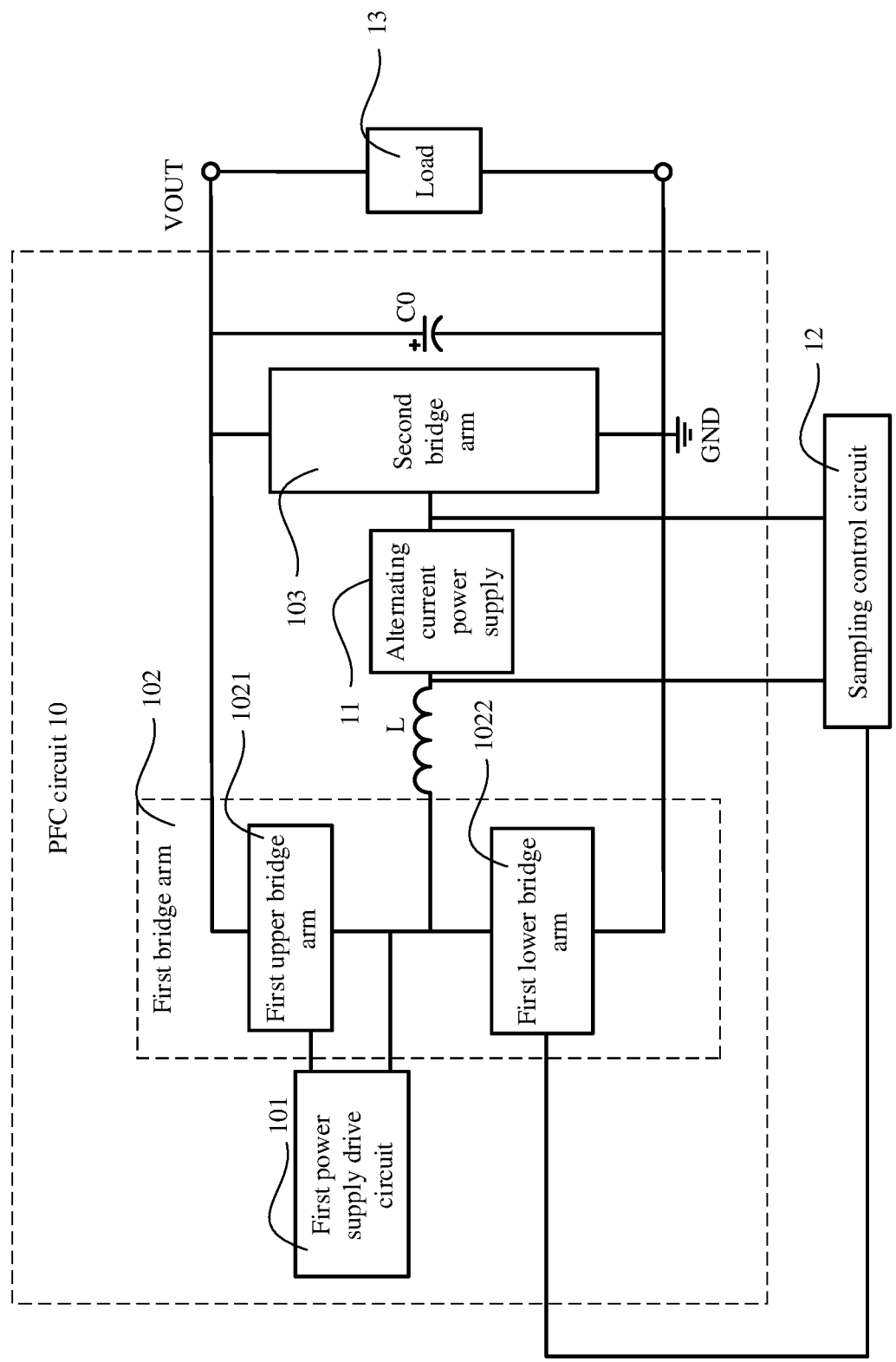
FIG. 2 is a schematic diagram of a structure of a control system according to an embodiment.

FIG. 2 is a schematic diagram of a structure of a control system according to an embodiment. As shown in FIG. 2, the control system may include a PFC circuit 10 and a sampling control circuit 12. The PFC circuit 10 herein may include an inductor L, a first power supply drive circuit 101, and a first bridge arm 102 and a second bridge arm 103 that are connected in parallel. A first parallel connection point between the first bridge arm 102 and the second bridge arm 103 is connected to a load 13, a second parallel connection point between the first bridge arm 102 and the second bridge arm 103 is grounded, a first bridge arm midpoint of the first bridge arm 102 is connected to a first connection end of an alternating current power supply 11 by using the inductor L, a second connection end of the alternating current power supply 11 is connected to a second bridge arm midpoint of the second bridge arm 103, the first bridge arm midpoint is a serial connection point between a first upper bridge arm 1021 and a first lower bridge arm 1022 of the first bridge arm 102, one end of the sampling control circuit 12 is separately connected to the first connection end of the alternating current power supply 11 and the second connection end of the alternating current power supply 11, the other end of the sampling control circuit 12 is connected to the first lower bridge arm 1022, a first connection end of the first power supply drive circuit 101 is connected to the first upper bridge arm 1021, and a second connection end of the first power supply drive circuit 101 is connected to the first bridge arm midpoint. Herein, the first bridge arm 102 and the second bridge arm 103 may be connected to the load 13 after being connected to a capacitor C0 in parallel. Herein, the sampling control circuit 12 may be configured to control, based on voltages of the two ends of the alternating current power supply 11, the first lower bridge arm 1022 to be turned on, so that the first power supply drive circuit 101 starts charging. The sampling control circuit 12 may be further configured to: when charging duration of the first power supply drive circuit 101 reaches first target duration, control the first lower bridge arm 1022 to be turned off, so that the first power supply drive circuit 101 completes charging.

In the implementation, the sampling control circuit 12 may determine values of the voltages of the two ends of the alternating current power supply 11 and output a corresponding drive control signal to provide an on-state voltage for the first lower bridge arm 1022 to turn on the first lower bridge arm 1022. In this case, because the first lower bridge arm 1022 is turned on and grounded, the first lower bridge arm 1022 and the first power supply drive circuit 101 form a path, so that the first power supply drive circuit 101 can charge a bootstrap charging element in the first power supply drive circuit 101 by using a power supply (that may be an external power supply or an internal power supply), to implement bootstrap charging of the first power supply drive circuit 101. When the charging duration of the first power supply drive circuit 101 reaches the first target duration, it may be determined (or considered) that the first power supply drive circuit 101 completes charging, and the sampling control circuit 12 may output a corresponding drive control signal to turn off the first lower bridge arm 1022. The first power supply drive circuit 101 in the PFC circuit 10 may be precharged when the sampling control circuit 12 determines that the values of the voltages of the two ends of the alternating current power supply 11 meet a precharging condition of the first power supply drive circuit 101, to reduce an electric energy loss in a process of charging the first power supply drive circuit 101, thereby improving electric energy utilization, and prolonging a service life of a circuit element.

Figure 3:
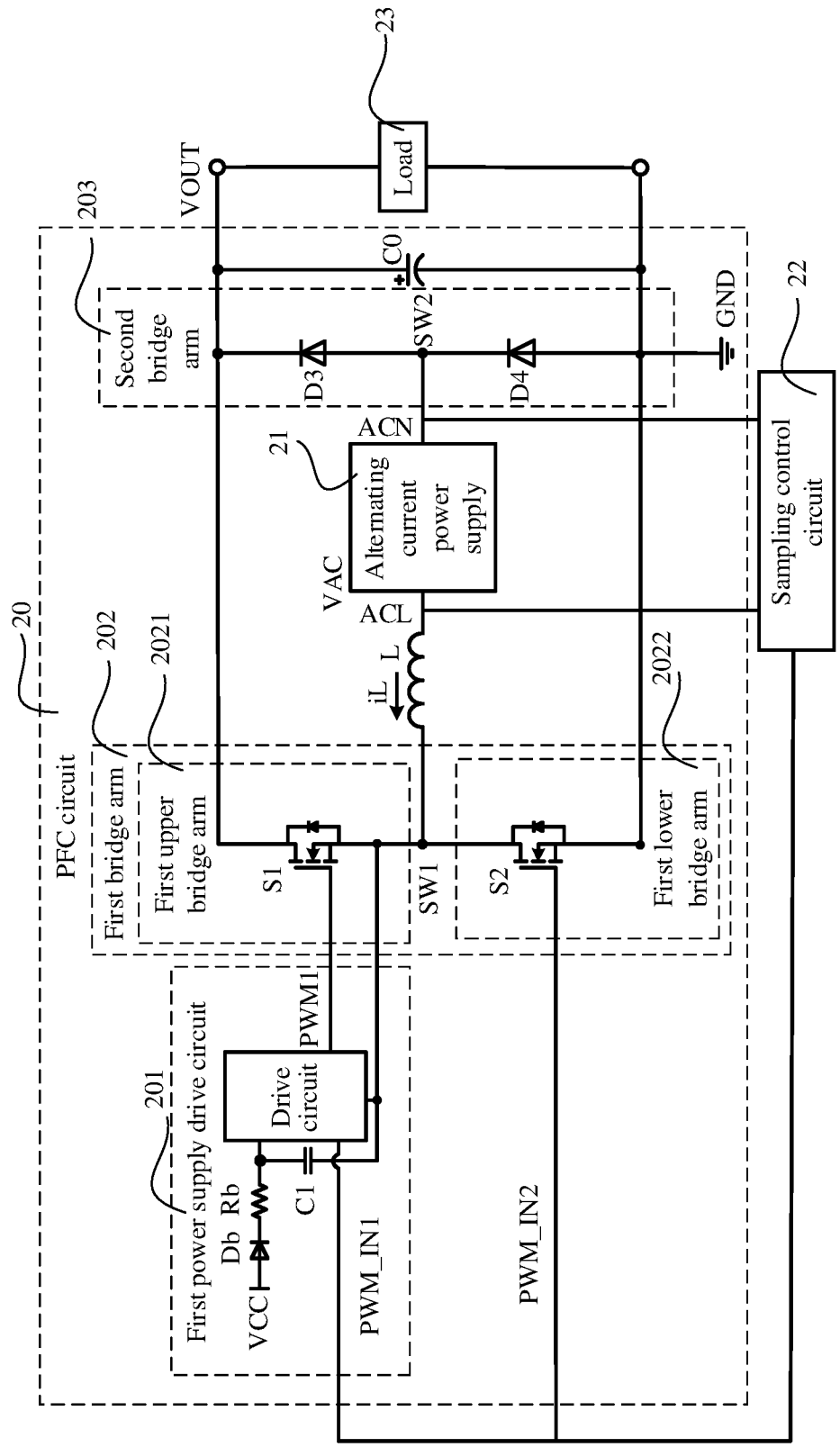
FIG. 3 is a schematic diagram of another structure of a control system according to an embodiment.

FIG. 3 is a schematic diagram of another structure of a control system according to an embodiment. As shown in FIG. 3, the control system includes a PFC circuit 20 and a sampling control circuit 22. The PFC circuit 20 includes an inductor L, a first power supply drive circuit 201, and a first bridge arm 202 and a second bridge arm 203 that are connected in parallel. A first parallel connection point between the first bridge arm 202 and the second bridge arm 203 is connected to a load 23, a second parallel connection point between the first bridge arm 202 and the second bridge arm 203 is grounded, a first bridge arm midpoint of the first bridge arm 202 is connected to a first connection end of an alternating current power supply 21 by using the inductor L, a second connection end of the alternating current power supply 21 is connected to a second bridge arm midpoint of the second bridge arm 203, the first bridge arm midpoint is a serial connection point between a first upper bridge arm 2021 and a first lower bridge arm 2022 of the first bridge arm 202, one end of the sampling control circuit 22 is separately connected to the first connection end of the alternating current power supply 21 and the second connection end of the alternating current power supply 21, the other end of the sampling control circuit 22 is connected to the first power supply drive circuit 201 and the first lower bridge arm 2022, a first connection end of the first power supply drive circuit 201 is connected to the first upper bridge arm 2021, and a second connection end of the first power supply drive circuit 201 is connected to the first bridge arm midpoint. Herein, the first upper bridge arm 2021 and the first lower bridge arm 2022 may be switching elements (for example, a switching transistor 51 and a switching transistor S2) with a switching function, such as MOSFETs, HEMTs, or IGBTs. The switching element may be turned on when an access voltage reaches an on-state voltage of the switching element or may be turned off when an access voltage of an input end is less than the on-state voltage of the switching element. Herein, the second bridge arm 203 may be a half-bridge circuit including two transistors (for example, a diode D3 and a diode D4) connected in series. Herein, the first power supply drive circuit 201 may be a power supply drive circuit including a bootstrap charging element. When the first lower bridge arm 2022 is turned on, the first power supply drive circuit 201 can charge the bootstrap charging element by using a power supply VCC (that may be an external power supply or an internal power supply), to implement bootstrap charging of the first power supply drive circuit 201.

In some feasible implementations, after the first power supply drive circuit 201 (namely, the bootstrap charging element (namely, a bootstrap capacitor C1) in the first power supply drive circuit 201) completes charging, the first power supply drive circuit 201 may generate, based on a drive control signal that is output by the sampling control circuit 22, a drive voltage greater than or equal to an on-state voltage of the first upper bridge arm 2021, to turn on the first upper bridge arm 2021.

In some feasible implementations, the sampling control circuit 22 may be configured to control, based on voltages of the two ends of the alternating current power supply 21, the first lower bridge arm 2022 to be turned on, so that the first power supply drive circuit 201 starts charging. Herein, the sampling control circuit 22 may detect the voltages of the two ends of the alternating current power supply 21. When the control system is in a pre-start state (for example, the load 23 accesses the control system, a standby level in the control system is lowered, or a pre-start signal is detected before the PFC circuit 20 normally supplies power to the load 23), the sampling control circuit 22 may determine values of the voltages of the two ends of the alternating current power supply 21. By determining the values of the voltages of the two ends of the alternating current power supply 21, the sampling control circuit 22 may output a corresponding drive control signal (that is, output a high-level drive control signal PWM_IN2) to provide an on-state voltage for the first lower bridge arm 2022 to turn on the first lower bridge arm 2022. In this case, because the first lower bridge arm 2022 is turned on and grounded, the first lower bridge arm 2022 and the first power supply drive circuit 201 form a path, so that the first power supply drive circuit 201 can charge the bootstrap charging element in the first power supply drive circuit 201 by using the power supply VCC (that may be an external power supply or an internal power supply), to implement bootstrap charging of the first power supply drive circuit 201.

In some feasible implementations, the sampling control circuit 22 may be further configured to: when charging duration of the first power supply drive circuit 201 reaches first target duration, control the first lower bridge arm 2022 to be turned off. Herein, that the charging duration of the first power supply drive circuit 201 reaches the first target duration indicates that the first power supply drive circuit 201 (namely, the bootstrap charging element in the first power supply drive circuit 201) completes charging. That is, when the first power supply drive circuit 201 (namely, the bootstrap charging element in the first power supply drive circuit 201) completes charging, the sampling control circuit 22 may output a corresponding drive control signal (that is, output a low-level drive control signal PWM_IN2) to turn off the first lower bridge arm 2022.

In some feasible implementations, after the first power supply drive circuit 201 (namely, the bootstrap charging element in the first power supply drive circuit 201) completes charging, the sampling control circuit 22 may output a corresponding drive control signal (output a high-level drive control signal PWM_IN1) to drive the first power supply drive circuit 201, so that the first power supply drive circuit 201 generates the drive voltage greater than or equal to the on-state voltage of the first upper bridge arm 2021, to turn on the first upper bridge arm 2021.

In the implementation, when the PFC circuit 20 is in a pre-start state (for example, the load 23 accesses the control system, a standby level in the control system is lowered, or a pre-start signal is detected before the PFC circuit 20 normally supplies power to the load 23), the sampling control circuit 22 may determine the values of the voltages of the two ends of the alternating current power supply 21. By determining the values of the voltages of the two ends of the alternating current power supply 21, the sampling control circuit 22 may output the corresponding drive control signal (that is, output the high-level drive control signal PWM_IN2) to provide the on-state voltage for the first lower bridge arm 2022 to turn on the first lower bridge arm 2022. In this case, because the first lower bridge arm 2022 is turned on and grounded, the first lower bridge arm 2022 and the first power supply drive circuit 201 form a path, so that the first power supply drive circuit 201 can charge the bootstrap charging element (for example, the bootstrap capacitor C1) in the first power supply drive circuit 201 by using the power supply VCC (that may be an external power supply or an internal power supply), to implement bootstrap charging of the first power supply drive circuit 201. When the charging duration of the first power supply drive circuit 201 reaches the first target duration, it may be determined (or considered) that the first power supply drive circuit 201 completes charging, and the sampling control circuit 22 may output the corresponding drive control signal (that is, output the low-level drive control signal PWM_IN2) to turn off the first lower bridge arm 2022. After the first power supply drive circuit 201 (namely, the bootstrap charging element in the first power supply drive circuit 201) completes charging, the sampling control circuit 22 may output the corresponding drive control signal (that is, output the high-level drive control signal PWM_IN1) to drive the first power supply drive circuit 201, so that the first power supply drive circuit 201 generates the drive voltage greater than or equal to the on-state voltage of the first upper bridge arm 2021, to turn on the first upper bridge arm 2021. The first power supply drive circuit 201 (namely, the bootstrap charging element (for example, the bootstrap capacitor C1)) in the PFC circuit 20 may be precharged only when necessary (that is, when the PFC circuit 20 is in the pre-start state), to reduce an electric energy loss in a process of charging the first power supply drive circuit 201, thereby improving electric energy utilization, and prolonging a service life of a circuit element.

Figure 4A:
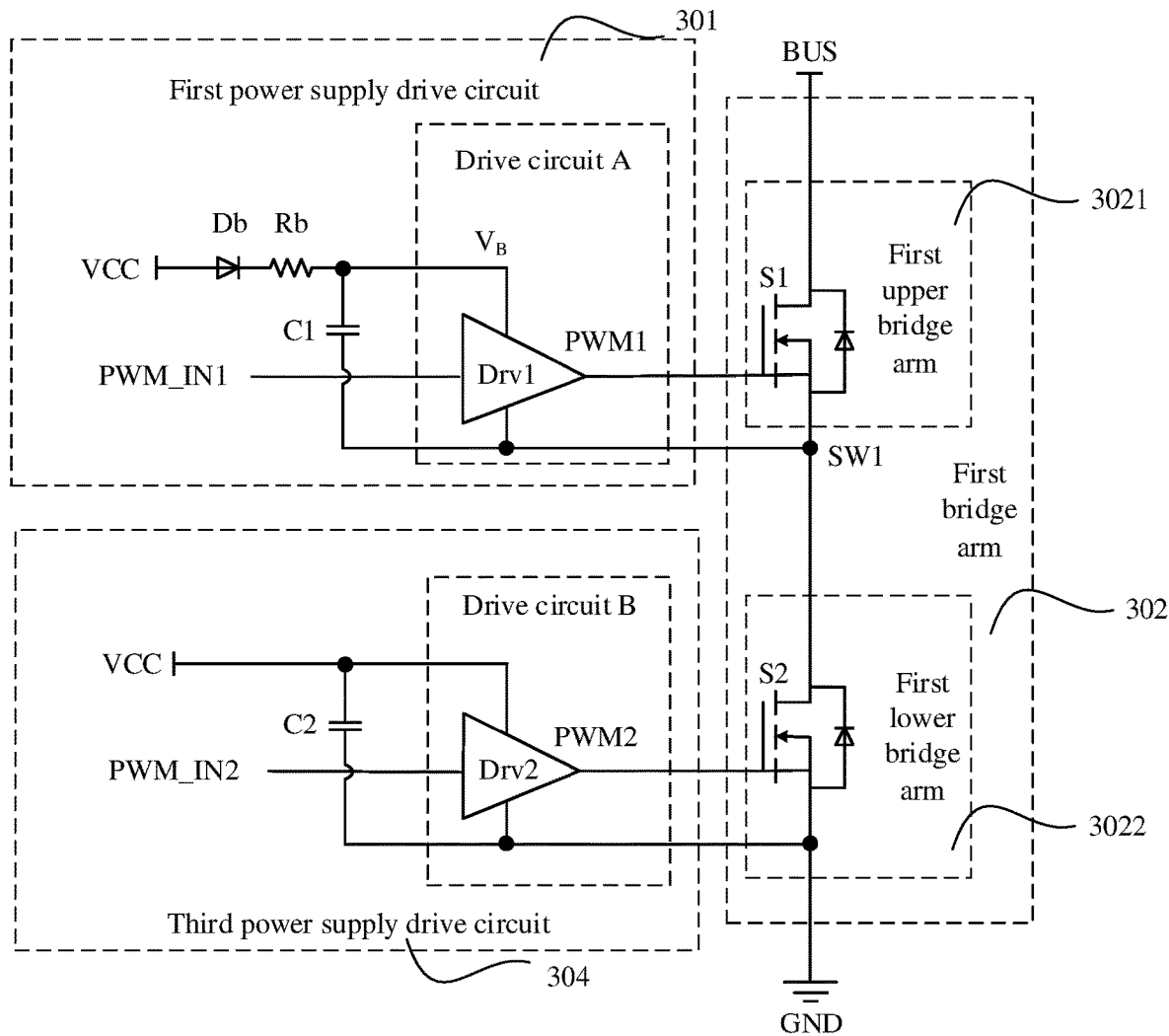
FIG. 4a is a schematic diagram of a structure of a power supply drive circuit connected to a first bridge arm according to an embodiment.

In some feasible implementations, for a structure and connection manner of the first power supply drive circuit, refer to FIG. 4a together. FIG. 4a is a schematic diagram of a structure of a power supply drive circuit connected to a first bridge arm according to an embodiment. As shown in FIG. 4a, a first power supply drive circuit 301 is a bootstrap power supply drive circuit, and includes a bootstrap capacitor C1, a bootstrap diode Db, and a drive circuit A. Herein, one end of the bootstrap capacitor C1 is separately connected to an output end of the bootstrap diode Db and a first connection end of the drive circuit A, the other end of the bootstrap capacitor C1 is separately connected to a second connection end of the drive circuit A and a bridge arm midpoint, an input end of the bootstrap diode Db is connected to a power supply VCC (that may be an external power supply or an internal power supply), a third connection end of the drive circuit A is connected to the sampling control circuit 22 (namely, an output end of a drive control signal PWM_IN1), and a fourth connection end of the drive circuit A is connected to a first upper bridge arm 3021.

Further, in some feasible implementations, the PFC circuit may further include a third power supply drive circuit 304, a first connection end of the third power supply drive circuit 304 is connected to a power supply VCC, a second connection end of the third power supply drive circuit 304 is grounded, a third connection end of the third power supply drive circuit 304 is connected to the sampling control circuit 22 (namely, an output end of a drive control signal PWM_IN2), and a fourth connection end of the third power supply drive circuit 304 is connected to a first lower bridge arm 3022. Herein, the sampling control circuit 22 may be configured to control, based on the voltages of the two ends of the alternating current power supply 21, the third power supply drive circuit 304 to turn on the first lower bridge arm 3022. When outputting a corresponding drive control signal (that is, output a high-level drive control signal PWM_IN2) based on the voltages of the two ends of the alternating current power supply 21 to control the third power supply drive circuit 304, the sampling control circuit 22 may turn on the first lower bridge arm 3022 by using the third power supply drive circuit 304.

Figure 4B:
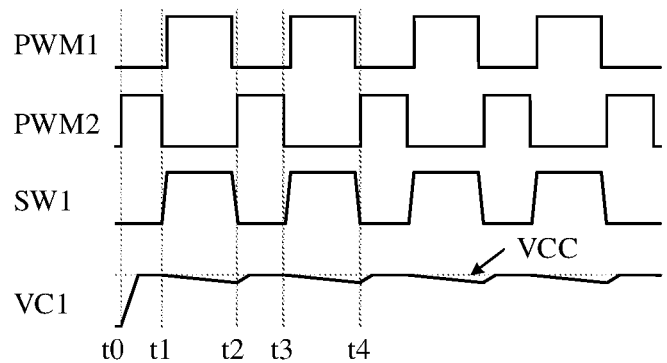
FIG. 4b is a schematic diagram of a working waveform of a power supply drive circuit connected to a first bridge arm according to an embodiment.

Herein, refer to FIG. 4b together. FIG. 4b is a schematic diagram of a working waveform of a power supply drive circuit connected to a first bridge arm according to an embodiment o. As shown in FIG. 4b, the power supply VCC may be configured to: when the sampling control circuit 22 controls the first lower bridge arm 3022 to be turned on (that is, PWM2 is at a high level at a moment t0), charge the bootstrap capacitor C1, to implement charging of the first power supply drive circuit 301. The sampling control circuit 22 may be further configured to: when charging duration of the bootstrap capacitor C1 reaches the first target duration (or after charging duration of the bootstrap capacitor C1 reaches the first target duration, for example, at a moment t1), control the first lower bridge arm to be turned off (that is, output a low-level drive control signal PWM_IN2). After the bootstrap capacitor C1 completes charging, the sampling control circuit 22 may output a corresponding drive control signal (that is, output a high-level drive control signal PWM_IN1) to control the drive circuit A to turn on the first upper bridge arm 3021 (that is, PWM1 is at a high level). It may be understood that when the first upper bridge arm 3021 works, a voltage of the first bridge arm midpoint (namely, SW1) is at a high level when the first upper bridge arm 3021 is turned on, or at a low level when the first upper bridge arm 3021 is turned off. When the first upper bridge arm 3021 is turned on, because voltages of two ends of the first bootstrap capacitor C1 are always kept near a relatively high level (for example, VCC), the first bootstrap capacitor C1 may provide a voltage that is VCC higher than that of the second connection end of the drive circuit A (namely, that of the SW1 point) for the first connection end of the drive circuit A, so that when a drive control signal PWM_IN1 received by the third connection end of the drive circuit A is at a high level, the fourth connection end of the drive circuit A can output an on-state voltage for turning on the first upper bridge arm 3021 (namely, a switching transistor 51), to maintain normal working of the first upper bridge arm 3021.

In some feasible implementations, to protect an electronic element in the control system, a protective resistor Rb may be connected between the power supply VCC and the bootstrap capacitor C1. When the sampling control circuit 22 controls the first lower bridge arm 3022 to be turned on, the power supply VCC, the first power supply drive circuit 301, and the first lower bridge arm 3022 form a path, so that the bootstrap capacitor C1 can be charged by using the power supply VCC, and the bootstrap capacitor C1 can be prevented, by using the bootstrap diode Db, from sending out electricity to the power supply VCC, so that a voltage of the bootstrap capacitor C1 persistently increases until the charging time of the bootstrap capacitor C1 meets the first target duration. Herein, the first target duration may be obtained through calculation by using a voltage of the power supply VCC, a value of the bootstrap capacitor C1, the charging current-limiting resistor Rb, and a drive voltage (namely, a voltage, between the first connection end of the drive circuit A and the second connection end of the drive circuit, obtained when the fourth connection end of the drive circuit A outputs a voltage for turning on the first upper bridge arm 3021) of the drive circuit A.

In the implementation, when the sampling control circuit 22 controls the first lower bridge arm 3022 to be turned on, the control system may charge the bootstrap capacitor C1 by using the power supply VCC, to implement charging of the power supply drive circuit. The sampling control circuit 22 may further determine whether the charging duration of the bootstrap capacitor C1 reaches the first target duration, to simply determine whether the first power supply drive circuit completes charging, and then when the first power supply drive circuit completes charging, control the first lower bridge arm to be turned off, thereby simplifying an operation of determining that the first power supply drive circuit completes charging, and improving working efficiency and working performance of the control system. In addition, the third power supply drive circuit 304 may be configured to drive the first lower bridge arm 3022, thereby simplifying a circuit structure of the sampling control circuit 22, reducing complexity of the control system, and improving applicability of the control system.

As shown in FIG. 3, in some feasible implementations, the sampling control circuit 22 may be configured to: when a voltage of the first connection end of the alternating current power supply 21 is less than a voltage of the second connection end of the alternating current power supply 21, control the first lower bridge arm 2022 to be turned on, so that the first power supply drive circuit 201 starts charging. It may be understood that when the sampling control circuit 22 determines that the voltage of the first connection end of the alternating current power supply 21 is less than the voltage of the second connection end of the alternating current power supply 21, the sampling control circuit 22 may output the corresponding drive control signal (that is, output the high-level drive control signal PWM_IN2) to provide the on-state voltage for the first lower bridge arm 2022 to turn on the first lower bridge arm 2022. In this case, because the first lower bridge arm 2022 is turned on and grounded, the first lower bridge arm 2022 and the first power supply drive circuit 201 form a path, so that the first power supply drive circuit 201 can charge the bootstrap charging element in the first power supply drive circuit 201 by using the power supply VCC, to implement bootstrap charging of the first power supply drive circuit 201.

In the implementation, the sampling control circuit 22 may compare a value of the voltage of the first connection end of the alternating current power supply 21 with a value of the voltage of the second connection end of the alternating current power supply 21, to simply determine when to start to output a drive control signal, so that the first power supply drive circuit 201 starts charging. The operation is simple, and applicability is strong, so that electric energy utilization can be further improved, and a service life of a circuit element can be further prolonged.

Figure 5A:
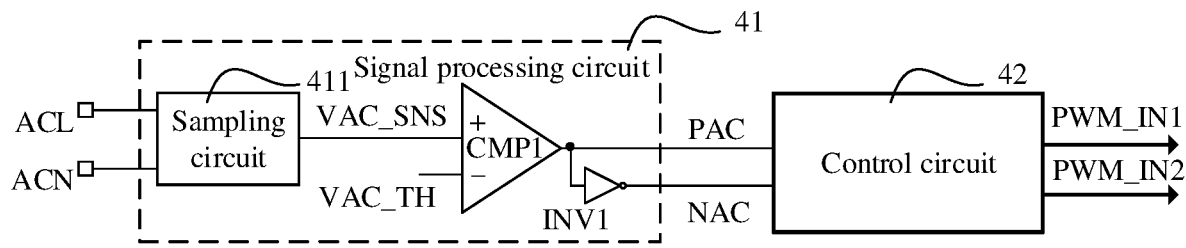
FIG. 5a is a schematic diagram of a structure of a sampling control circuit according to an embodiment.

In some feasible implementations, refer to FIG. 5a together. FIG. 5a is a schematic diagram of a structure of a sampling control circuit according to an embodiment. As shown in FIG. 5a, the sampling control circuit 22 may include a signal processing circuit 41 and a control circuit 42. Herein, the signal processing circuit 41 may include a sampling circuit 411, a comparator CMP1, and a NAND gate circuit INV1. Herein, one end (namely, an input end of the sampling circuit 411) of the signal processing circuit 41 is used as one end of the sampling control circuit 22 to be separately connected to the first connection end (namely, an ACL signal end) of the alternating current power supply 21 and the second connection end (namely, an ACN signal end) of the alternating current power supply 21, an output end of the sampling circuit 411 is connected to an input end of the comparator CMP1, an output end (that is, used as the other end of the signal processing circuit 41) of the comparator CMP1 is separately directly connected to the control circuit 42 and connected to the control circuit 42 by using the NAND gate circuit INV1, the other end of the control circuit 42 is used as an output of the sampling control circuit 22 to be connected to a power supply drive circuit.

Figure 5B:
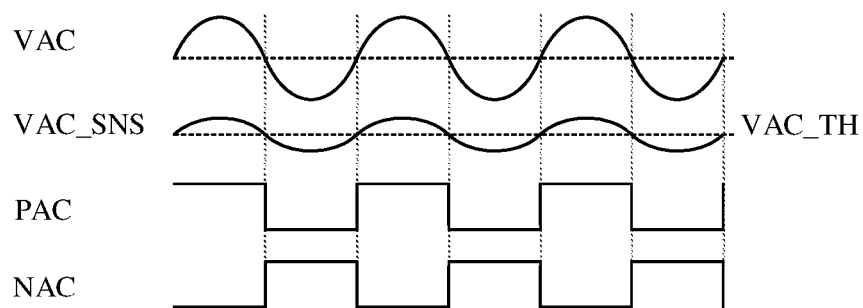
FIG. 5b is a schematic diagram of a working waveform of a signal processing circuit according to an embodiment.

FIG. 5b is a schematic diagram of a working waveform of a signal processing circuit according to an embodiment. As shown in FIG. 5b, the signal processing circuit 41 may be configured to: collect the voltages of the two ends (namely, the ACL end and the ACN end) of the alternating current power supply 21 and generate corresponding drive determining signals based on the voltages of the two ends of the alternating current power supply 21. The sampling circuit 411 may be configured to: collect the voltages of the two ends (namely, the ACL signal end and the ACN signal end) of the alternating current power supply 21 (namely, a signal VAC), generate a sampling signal (namely, VAC_SNS), and input the sampling signal to the comparator CMP1. Herein, a determining threshold of the comparator CMP1 is VAC_TH. When the comparator CMP1 determines that the sampling signal is higher than the determining threshold, the comparator CMP1 may consider that in this case, a voltage of the ΔCL signal end is greater than a voltage of the ACN signal end (in other words, the voltage of the first connection end of the alternating current power supply 21 is greater than the voltage of the second connection end of the alternating current power supply 21), and generate drive determining signals (namely, a high-level signal PAC and a low-level signal NAC). When the comparator CMP1 determines that the sampling signal is lower than the determining threshold, the comparator CMP1 may consider that in this case, a voltage of the ACL signal end is less than a voltage of the ACN signal end (in other words, the voltage of the first connection end of the alternating current power supply 21 is less than the voltage of the second connection end of the alternating current power supply 21), and generate drive determining signals (namely, a low-level signal PAC and a high-level signal NAC).

Figure 6A:
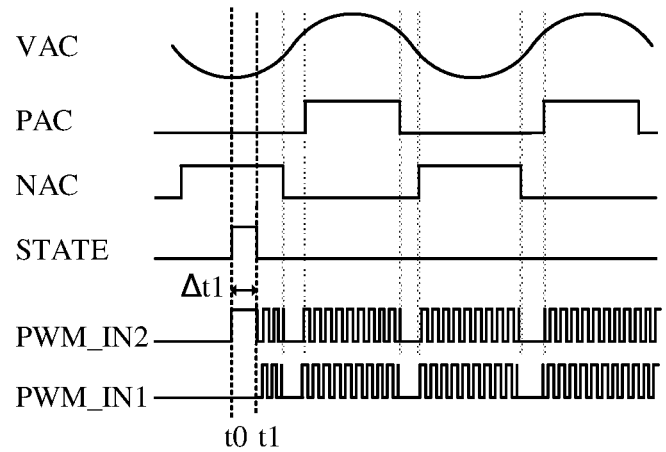
FIG. 6a is a schematic diagram of a control waveform of a sampling control circuit according to an embodiment.

Refer to FIG. 6a together. FIG. 6a is a schematic diagram of a control waveform of a sampling control circuit according to an embodiment. As shown in FIG. 6a, the control circuit 42 may be configured to: generate drive control signals (namely, a signal PWM_IN1 and a signal PWM_IN2) based on the drive determining signals (namely, the signal PAC and the signal NAC), and control, by using the drive control signals, the power supply drive circuit to turn on and/or turn off a corresponding bridge arm, where the power supply drive circuit includes the first power supply drive circuit 201, a second power supply drive circuit, and/or the third power supply drive circuit 204. Herein, the signal processing circuit 41 may detect the voltages of the two ends of the alternating current power supply 21. When the control system is in the pre-start state (for example, the load 23 accesses the control system, a standby level in the control system is lowered, or a pre-start signal is detected before the PFC circuit 20 normally supplies power to the load 23), the signal processing circuit 41 may determine the values of the voltages of the two ends of the alternating current power supply 21. The signal processing circuit 41 may output the corresponding drive determining signals by determining the values of the voltages of the two ends of the alternating current power supply 21. For example, when determining that the voltage of the first connection end of the alternating current power supply 21 is less than the voltage of the second connection end of the alternating current power supply 21, the signal processing circuit 41 may output corresponding drive determining signals (high-level NAC and low-level PAC); or when determining that the voltage of the first connection end of the alternating current power supply 21 is greater than the voltage of the second connection end of the alternating current power supply 21, the signal processing circuit 41 may output corresponding drive determining signals (low-level NAC and high-level PAC). Herein, the control circuit 42 may generate the drive control signals based on the drive determining signals, and control, by using the drive control signals, the power supply drive circuit to turn on and/or turn off the corresponding bridge arm. For example, when determining that the voltage of the first connection end of the alternating current power supply 21 is less than the voltage of the second connection end of the alternating current power supply 21 (that is, at a moment t0), the signal processing circuit 41 may output the corresponding drive determining signals (high-level NAC and low-level PAC), and the control circuit 42 may generate drive control signals based on the drive determining signals, and output a high-level drive control signal PWM_IN2 to turn on the first lower bridge arm 2022, so that the first power supply drive circuit 201 is charged. In addition, the control circuit 42 may also keep a drive control signal PWM_IN1 at a low level to turn off the first upper bridge arm 2021. For clarity of description, a state signal STATE for describing a power supply system is added. From left to right, when the STATE signal is kept at a low level, the PFC circuit is in a standby state; when the STATE signal jumps from the low level to a high level, the PFC circuit is in the pre-start state; when the STATE signal is kept at the high level, the PFC circuit is in a precharging state; when the STATE signal jumps from the high level to the low level, the PFC circuit completes bootstrap charging; and when the STATE signal jumps from the high level to the low level and is kept at the low level, the PFC circuit normally works. When the charging duration of the first power supply drive circuit 201 reaches the first target duration (that is, charging duration Δt1≥first target duration Th1 at a moment t1), the control circuit 42 may generate drive control signals, and output a low-level drive control signal PWM_IN2 to turn off the first lower bridge arm 2022. After the first power supply drive circuit 201 completes charging, the control circuit 42 may output a high-level drive control signal PWM_IN1 to turn on the first upper bridge arm 2021.

In the implementation, the sampling control circuit 22 collects and determines the voltages of the two ends of the alternating current power supply 21 by using the signal processing circuit 41, and outputs the corresponding drive determining signals. The control circuit 42 may generate the drive control signals based on the drive determining signals, and control, by using the drive control signals, the power supply drive circuit to turn on and/or turn off the corresponding bridge arm. Therefore, a circuit structure of the control system is further simplified, complexity of the control system is further reduced, and applicability of the control system is further improved.

Figure 6B:
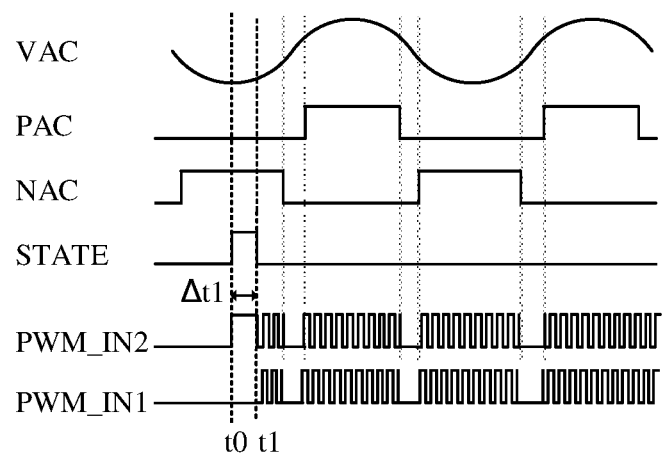
FIG. 6b is a schematic diagram of another control waveform of a sampling control circuit according to an embodiment.

In some feasible implementations, refer to FIG. 6b together. FIG. 6b is a schematic diagram of another control waveform of a sampling control circuit according to an embodiment. As shown in FIG. 6b, the sampling control circuit 22 may be further configured to: when the voltage of the first connection end of the alternating current power supply 21 changes from being less than the voltage of the second connection end of the alternating current power supply 21 to being greater than or equal to the voltage of the second connection end of the alternating current power supply 21, and the charging time of the first power supply drive circuit 201 is less than the first target duration, control the first lower bridge arm 2022 to be turned off; and when the voltage of the first connection end of the alternating current power supply 21 changes from being greater than or equal to the voltage of the second connection end of the alternating current power supply 21 to being less than the voltage of the second connection end of the alternating current power supply 21, control the first lower bridge arm 2022 to be turned on, so that the charging time of the first power supply drive circuit 201 reaches the first target duration. Herein, when the sampling circuit determines that the voltage of the first connection end of the alternating current power supply 21 is less than the voltage of the second connection end of the alternating current power supply 21 (that is, at a moment t0), the sampling control circuit 22 may output a corresponding drive control signal (that is, output a high-level drive control signal PWM_IN2) to turn on the first lower bridge arm 2022, so that the first power supply drive circuit 201 starts charging. That is, from a moment at which the first power supply drive circuit 201 starts charging to a moment at which the voltage of the first connection end of the alternating current power supply 21 changes to being greater than or equal to the voltage of the second connection end of the alternating current power supply 21 (that is, at a moment t1), the charging duration of the first power supply drive circuit 201 is less than the first target duration (that is, charging duration Δt1<first target duration Th1 at the moment t1), that is, the first power supply drive circuit 201 (namely, the bootstrap charging element) does not complete charging. It may be understood that, in this case, even if the sampling control circuit 22 outputs a corresponding drive control signal (that is, outputs a high-level drive control signal PWM_IN1) to the first power supply drive circuit 201, the first power supply drive circuit 201 cannot provide an on-state voltage for the first upper bridge arm 2021 to turn on the first upper bridge arm 2021. In this case, the sampling control circuit 22 may first control the first lower bridge arm 2022 to be turned off (that is, output a low-level drive control signal PWM_IN2); and when the voltage of the first connection end of the alternating current power supply 21 changes from being greater than or equal to the voltage of the second connection end of the alternating current power supply 21 to being less than the voltage of the second connection end of the alternating current power supply 21 (that is, when a charging start condition of the first power supply drive circuit 201 is met again, that is, at a moment t3), control the first lower bridge arm 2022 to be turned on, so that the charging time of the first power supply drive circuit 201 reaches the first target duration (that is, charging duration Δt2≥first target duration Th1 at a moment t4). For clarity of description, a state signal STATE for describing a power supply system is added. From left to right, when the STATE signal is kept at a low level, the PFC circuit is in a standby state; when the STATE signal jumps from the low level to a high level, the PFC circuit is in the pre-start state; when the STATE signal is kept at the high level, the PFC circuit is in a precharging state; when the STATE signal jumps from the high level to the low level, the PFC circuit completes bootstrap charging; and when the STATE signal jumps from the high level to the low level and is kept at the low level, the PFC circuit normally works.

In the implementation, when the voltages of the two ends of the alternating current power supply 21 do not meet a charging condition of the first power supply drive circuit 201 (that is, the voltage of the first connection end of the alternating current power supply 21 changes from being less than the voltage of the second connection end of the alternating current power supply 21 to being greater than or equal to the voltage of the second connection end of the alternating current power supply 21), and the first power supply drive circuit 201 does not complete charging, the sampling control circuit 22 may control the first lower bridge arm 2022 to be turned off; and when the voltages of the two ends of the alternating current power supply 21 meet the charging condition of the first power supply drive circuit 201 again (that is, the voltage of the first connection end of the alternating current power supply 21 changes from being greater than or equal to the voltage of the second connection end of the alternating current power supply 21 to being less than the voltage of the second connection end of the alternating current power supply 21), control the first lower bridge arm 2022 to be turned on, so that the charging time of the first power supply drive circuit 201 reaches the first target duration (in other words, the first power supply drive circuit 201 completes charging). The operation is simple, and applicability is strong, so that on a basis of ensuring that the first power supply drive circuit 201 completes charging, electric energy utilization can be further improved, and a service life of a circuit element can be further prolonged.

Figure 7:
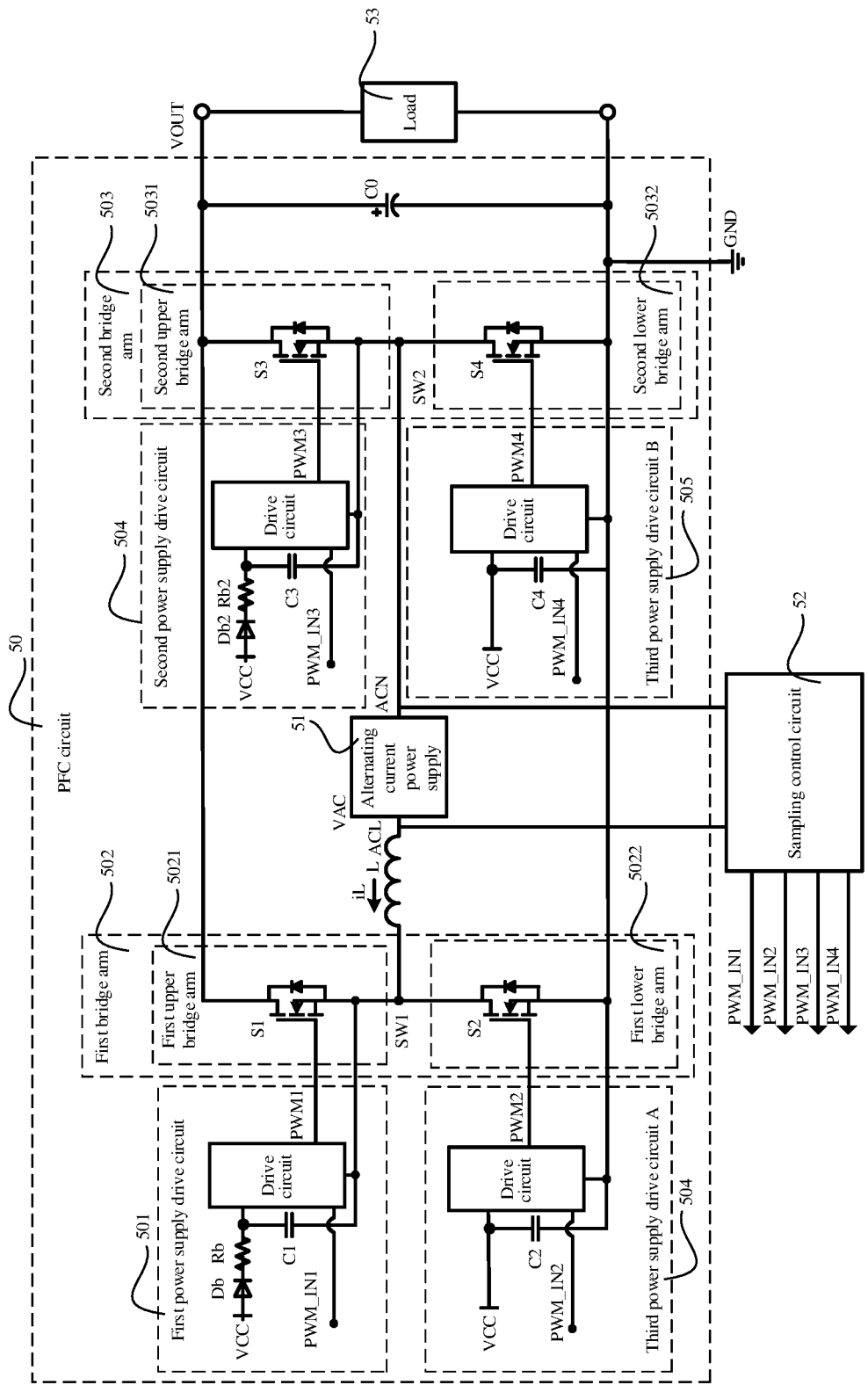
FIG. 7 is a schematic diagram of another structure of a control system according to an embodiment.

FIG. 7 is a schematic diagram of another structure of a control system according to an embodiment. As shown in FIG. 7, a PFC circuit 50 of the control system further includes a second power supply drive circuit 504, one end of a sampling control circuit 52 is connected to a second bridge arm midpoint, the second bridge arm midpoint is a serial connection point between a second upper bridge arm 5031 and a second lower bridge arm 5032 of the second bridge arm, the other end of the sampling control circuit 52 is connected to the second power supply drive circuit 504 and the second lower bridge arm 5032, a first connection end of the second power supply drive circuit 504 is connected to the second upper bridge arm 5031, and a second connection end of the second power supply drive circuit 504 is connected to the second bridge arm midpoint. Herein, the second upper bridge arm 5031 and the second lower bridge arm 5031 may be switching elements (for example, a switching transistor S3 and a switching transistor S4) with a switching function, such as MOSFETs, HEMTs, or IGBTs. The switching element may be turned on when an access voltage reaches an on-state voltage of the switching element or may be turned off when an access voltage of an input end is less than the on-state voltage of the switching element. Herein, the second power supply drive circuit 504 may be a power supply drive circuit including a bootstrap charging element. When the second lower bridge arm 5032 is turned on, the second power supply drive circuit 504 can charge the bootstrap charging element (namely, a bootstrap capacitor C3) by using a power supply (that may be an external power supply or an internal power supply), to implement bootstrap charging of the second power supply drive circuit 504. After the second power supply drive circuit (namely, the bootstrap charging element in the second power supply drive circuit) completes charging, the second power supply drive circuit 504 may generate, based on a drive control signal that is output by the sampling control circuit 52, a drive voltage greater than or equal to an on-state voltage of the second upper bridge arm 5031, to turn on the second upper bridge arm 5031.

In some feasible implementations, the sampling control circuit 52 may be configured to control, based on voltages of two ends of an alternating current power supply 51, the second lower bridge arm 5032 to be turned on, so that the second power supply drive circuit 501 starts charging. Herein, the sampling control circuit 52 may detect the voltages of the two ends of the alternating current power supply 51. When the control system is in a pre-start state (for example, a load 53 accesses the control system, a standby level in the control system is lowered, or a pre-start signal is detected before the PFC circuit 50 normally supplies power to the load 53), the sampling control circuit 52 may determine values of the voltages of the two ends of the alternating current power supply 51. By determining the values of the voltages of the two ends of the alternating current power supply 51 (that is, when a voltage of a first connection end of the alternating current power supply 51 is greater than a voltage of a second connection end of the alternating current power supply 51), the sampling control circuit 52 may output a corresponding drive control signal (that is, output a high-level drive control signal PWM_IN4) to provide an on-state voltage for the second lower bridge arm 5032 to turn on the second lower bridge arm 5032. In this case, because the second lower bridge arm 5032 is turned on and grounded, the second lower bridge arm 5032 and the second power supply drive circuit 501 form a path, so that the second power supply drive circuit 501 can charge the bootstrap charging element in the second power supply drive circuit 501 by using the power supply VCC (that may be an external power supply or an internal power supply), to implement bootstrap charging of the second power supply drive circuit 501.

In some feasible implementations, the sampling control circuit 52 may be further configured to: when charging duration of the second power supply drive circuit 501 reaches second target duration, control the second lower bridge arm 5032 to be turned off. Herein, when the charging duration of the second power supply drive circuit 501 reaches the second target duration, it may be considered that the second power supply drive circuit 501 (namely, the bootstrap charging element in the second power supply drive circuit 501) completes charging. That is, when the second power supply drive circuit 501 (namely, the bootstrap charging element in the second power supply drive circuit 501) completes charging, the sampling control circuit 52 may output a corresponding drive control signal (that is, output a low-level drive control signal PWM_IN4) to turn off the second lower bridge arm 5032.

In some feasible implementations, after the second power supply drive circuit 501 (namely, the bootstrap charging element in the second power supply drive circuit 501) completes charging, the sampling control circuit 52 may output a corresponding drive control signal (output a high-level drive control signal PWM_IN3) to drive the second power supply drive circuit 501, so that the second power supply drive circuit 501 generates the drive voltage greater than or equal to the on-state voltage of the second upper bridge arm 5031, to turn on the second upper bridge arm 5031.

In the implementation, when the PFC circuit 50 is in a pre-start state (for example, the load 53 accesses the control system, a standby level in the control system is lowered, or a pre-start signal is detected before the PFC circuit 50 normally supplies power to the load 53), the sampling control circuit 52 may determine the values of the voltages of the two ends of the alternating current power supply 51. By determining the values of the voltages of the two ends of the alternating current power supply 51, the sampling control circuit 52 may output the corresponding drive control signal (that is, output the high-level drive control signal PWM_IN2) to provide the on-state voltage for the second lower bridge arm 5032 to turn on the second lower bridge arm 5032. In this case, because the second lower bridge arm 5032 is turned on and grounded, the second lower bridge arm 5032 and the second power supply drive circuit 501 form a path, so that the second power supply drive circuit 501 can charge the bootstrap charging element in the second power supply drive circuit 501 by using the power supply VCC (that may be an external power supply or an internal power supply), to implement bootstrap charging of the second power supply drive circuit 501. When the charging duration of the second power supply drive circuit 501 reaches the second target duration, it may be determined (or considered) that the second power supply drive circuit 501 completes charging, and the sampling control circuit 52 may output the corresponding drive control signal (that is, output the low-level drive control signal PWM_IN4) to turn off the second lower bridge arm 5032. After the second power supply drive circuit 501 (namely, the bootstrap charging element in the second power supply drive circuit 501) completes charging, the sampling control circuit 52 may output the corresponding drive control signal (that is, output the high-level drive control signal PWM_IN3) to drive the second power supply drive circuit 501, so that the second power supply drive circuit 501 generates the drive voltage greater than or equal to the on-state voltage of the second upper bridge arm 5031, to turn on the second upper bridge arm 5031. The second power supply drive circuit 501 (namely, the bootstrap charging element (the bootstrap capacitor)) in the PFC circuit 50 may be precharged only when necessary (that is, when the PFC circuit 50 is in the pre-start state), to reduce an electric energy loss in a process of charging the second power supply drive circuit 501, thereby improving electric energy utilization, and prolonging a service life of a circuit element.

In some feasible implementations, the sampling control circuit 52 may be further configured to: when the voltage of the first connection end of the alternating current power supply 51 changes from being greater than the voltage of the second connection end of the alternating current power supply 51 to being less than or equal to the voltage of the second connection end of the alternating current power supply 51, and the charging time of the second power supply drive circuit 504 is less than the second target duration, control the second lower bridge arm 5032 to be turned off; and when the voltage of the first connection end of the alternating current power supply 51 changes from being less than or equal to the voltage of the second connection end of the alternating current power supply 51 to being greater than the voltage of the second connection end of the alternating current power supply 51, control the second lower bridge arm 5032 to be turned on, so that the charging time of the second power supply drive circuit 504 reaches the second target duration. Herein, when the sampling circuit determines that the voltage of the first connection end of the alternating current power supply 51 is greater than the voltage of the second connection end of the alternating current power supply 51, the sampling control circuit 52 may output the corresponding drive control signal (that is, output the high-level drive control signal PWM_IN4) to turn on the second lower bridge arm 5032, so that the second power supply drive circuit 504 starts charging. That is, from a moment at which the second power supply drive circuit 504 starts charging to a moment at which the voltage of the first connection end of the alternating current power supply 51 changes to being less than or equal to the voltage of the second connection end of the alternating current power supply 51, the charging duration of the second power supply drive circuit 504 may be less than the second target duration, that is, the second power supply drive circuit 504 (namely, the bootstrap charging element) does not complete charging. It may be understood that, in this case, even if the sampling control circuit 52 outputs a corresponding drive control signal (that is, outputs a high-level drive control signal PWM_IN3) to the second power supply drive circuit 504, the second power supply drive circuit 504 cannot provide an on-state voltage for the second upper bridge arm 5031 to turn on the second upper bridge arm 5031. In this case, the sampling control circuit 52 may first control the second lower bridge arm 5032 to be turned off (that is, output a low-level drive control signal PWM_IN4); and when the voltage of the first connection end of the alternating current power supply 51 changes from being less than or equal to the voltage of the second connection end of the alternating current power supply 51 to being greater than the voltage of the second connection end of the alternating current power supply 51 (that is, when a charging start condition of the second power supply drive circuit 504 is met again), control the second lower bridge arm 5032 to be turned on, so that the charging time of the second power supply drive circuit 504 reaches the second target duration.

In the implementation, when the voltages of the two ends of the alternating current power supply 51 do not meet a charging condition of the second power supply drive circuit 504 (that is, the voltage of the first connection end of the alternating current power supply 51 changes from being greater than the voltage of the second connection end of the alternating current power supply 51 to being less than or equal to the voltage of the second connection end of the alternating current power supply 51), and the second power supply drive circuit 504 does not complete charging, the sampling control circuit 52 may control the second lower bridge arm 5032 to be turned off; and when the voltages of the two ends of the alternating current power supply 51 meet the charging condition of the second power supply drive circuit 504 again (that is, the voltage of the first connection end of the alternating current power supply 51 changes from being less than or equal to the voltage of the second connection end of the alternating current power supply 51 to being greater than the voltage of the second connection end of the alternating current power supply 51), control the second lower bridge arm 5032 to be turned on, so that the charging time of the second power supply drive circuit 504 reaches the second target duration (in other words, the second power supply drive circuit 504 completes charging). The operation is simple, and applicability is strong, so that on a basis of ensuring that the second power supply drive circuit 504 completes charging, electric energy utilization can be further improved, and a service life of a circuit element can be further prolonged.

In some feasible implementations, the second power supply drive circuit 501 may be a power supply drive circuit. A working principle of the second power supply drive circuit 501 and a calculation method of the second target duration are similar to the working principle of the first power supply drive circuit and the calculation method of the first target duration that are described in FIG. 3, and details are not described herein.

Further, in some feasible implementations, the PFC circuit may further include a third power supply drive circuit B 505. A working principle of the third power supply drive circuit B 505 is similar to the working principle of the third power supply drive circuit described in FIG. 3, and details are not described herein.

Figure 8A:
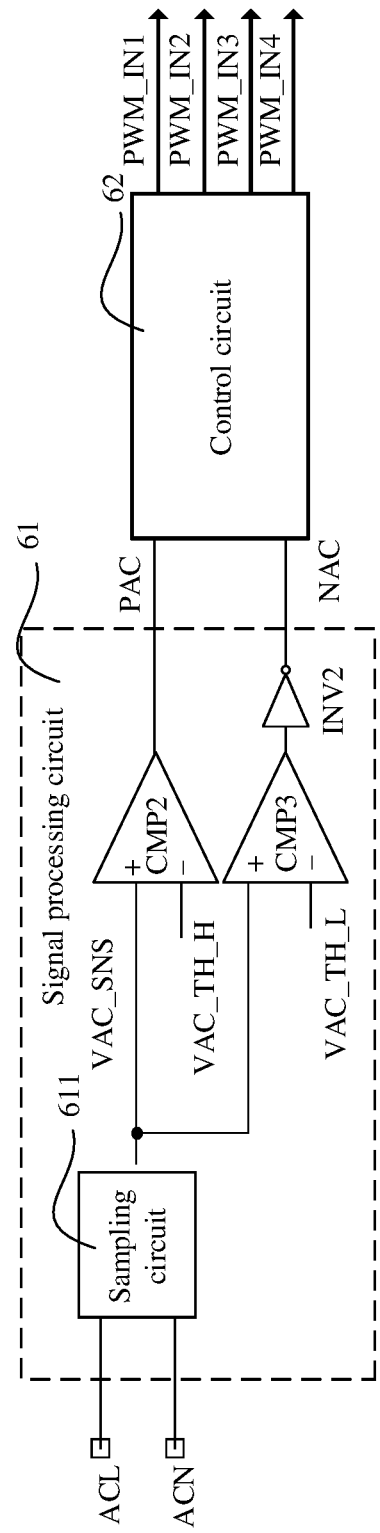
FIG. 8a is a schematic diagram of another structure of a sampling control circuit according to an embodiment.

In some feasible implementations, refer to FIG. 8*a* together. FIG. 8*a* is a schematic diagram of another structure of a sampling control circuit according to an embodiment. As shown in FIG. 8*a*, the sampling control circuit 52 may include a signal processing circuit 61 and a control circuit 62. Herein, the signal processing circuit 61 may include a sampling circuit 611, a comparator CMP2, a comparator CMP3, and a NAND gate circuit INV2. Herein, one end (namely, an input end of the sampling circuit 611) of the signal processing circuit 61 is used as one end of the sampling control circuit 52 to be separately connected to the first connection end (namely, an ACL signal end) of the alternating current power supply 51 and the second connection end (namely, an ACN signal end) of the alternating current power supply 51, an output end of the sampling circuit 611 is separately connected to input ends of the comparator CMP2 and the comparator CMP3, an output end of the comparator CMP2 is directly connected to the control circuit 62, and an output end of the comparator CMP3 is connected to the control circuit 62 by using the NAND gate circuit INV2, the other end of the control circuit 62 is used as an output of the sampling control circuit 52 to be connected to a power supply drive circuit.

Figure 8B:
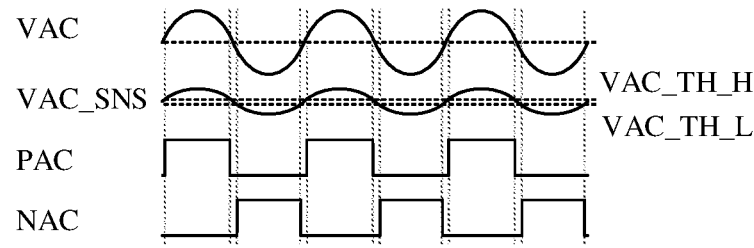
FIG. 8b is a schematic diagram of another working waveform of a signal processing circuit according to an embodiment.

In some feasible implementations, some dead time may be added between drive determining signals (namely, PAC and NAC) output by the signal processing circuit 61, to avoid control time overlapping. Therefore, before the signal processing circuit 61 outputs the drive determining signals, a slightly larger threshold and a slightly smaller threshold may be used for determining. FIG. 8*b* is a schematic diagram of a working waveform of a signal processing circuit according to an embodiment. As shown in FIG. 8*b*, the signal processing circuit 61 may be configured to: collect the voltages of the two ends (namely, the ACL end and the ACN end) of the alternating current power supply 51 and generate the corresponding drive determining signals based on the voltages of the two ends of the alternating current power supply 51. The sampling circuit 611 may be configured to: collect the voltages of the two ends (namely, the ACL signal end and the ACN signal end) of the alternating current power supply 51 (namely, a signal VAC), generate a sampling signal (VAC_SNS), and input the sampling signal to the comparator CMP2 and the comparator CMP3. Herein, a determining threshold of the comparator CMP2 is VAC_TH_H (the threshold is slightly larger), and a determining threshold of the comparator CMP3 is VAC_TH_L (the threshold is slightly smaller). When the comparator CMP2 determines that the sampling signal is higher than the determining threshold, the comparator CMP2 may consider that in this case, a voltage of the ACL signal end is greater than a voltage of the ACN signal end (in other words, the voltage of the first connection end of the alternating current power supply 51 is greater than the voltage of the second connection end of the alternating current power supply 51), and generate drive determining signals (namely, a high-level signal PAC and a low-level signal NAC). When the comparator CMP3 determines that the sampling signal is lower than the determining threshold, the comparator CMP2 may consider that in this case, a voltage of the ACL signal end is less than a voltage of the ACN signal end (in other words, the voltage of the first connection end of the alternating current power supply 51 is less than the voltage of the second connection end of the alternating current power supply 51), and generate drive determining signals (namely, a low-level signal PAC and a high-level signal NAC).

It may be understood that when the voltage of the first connection end of the alternating current power supply 52 changes from being greater than the voltage of the second connection end of the alternating current power supply to being less than or equal to the voltage of the second connection end of the alternating current power supply 52, and the charging time of the second power supply drive circuit 504 is less than the second target duration, a working method of the control system in this case is similar to the process described in FIG. 6*b*, and details are not described herein.

Figure 9A:
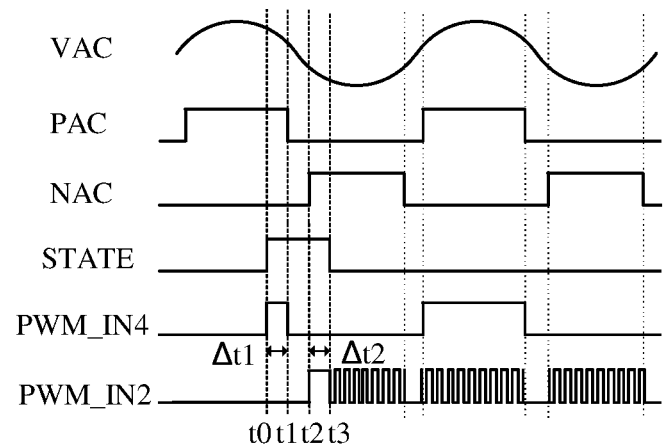
FIG. 9a is a schematic diagram of another control waveform of a sampling control circuit according to an embodiment.

Refer to FIG. 9*a* together. FIG. 9*a* is a schematic diagram of another control waveform of a sampling control circuit according to an embodiment. As shown in FIG. 9*a*, the control circuit 62 may be configured to: generate drive control signals (namely, a signal PWM_IN1, a signal PWM_IN2, a signal PWM_IN3, and a signal PWM_IN4) based on the drive determining signals (namely, the signal PAC and the signal NAC), and control, by using the drive control signals, the power supply drive circuit to turn on and/or turn off a corresponding bridge arm, where the power supply drive circuit includes a first power supply drive circuit 501, the second power supply drive circuit, and/or a third power supply drive circuit (namely, a third power supply drive circuit A 504 and/or the third power supply drive circuit B 505). Herein, the signal processing circuit 61 may detect the voltages of the two ends of the alternating current power supply 51. When the control system is in the pre-start state (for example, the load 53 accesses the control system, a standby level in the control system is lowered, or a pre-start signal is detected before the PFC circuit 50 normally supplies power to the load 53), the signal processing circuit 61 may determine the values of the voltages of the two ends of the alternating current power supply 51. The signal processing circuit 61 may output the corresponding drive determining signals by determining the values of the voltages of the two ends of the alternating current power supply 51.

For example, when determining that the voltage of the first connection end of the alternating current power supply 51 is less than the voltage of the second connection end of the alternating current power supply 51, the signal processing circuit 61 may output corresponding drive determining signals (high-level NAC and low-level PAC); or when determining that the voltage of the first connection end of the alternating current power supply 51 is greater than the voltage of the second connection end of the alternating current power supply 51, the signal processing circuit 61 may output corresponding drive determining signals (low-level NAC and high-level PAC). Herein, the control circuit 62 may generate the drive control signals based on the drive determining signals, and control, by using the drive control signals, the power supply drive circuit to turn on and/or turn off the corresponding bridge arm. For example, when determining that the voltage of the first connection end of the alternating current power supply 51 is greater than the voltage of the second connection end of the alternating current power supply 51 (that is, at a moment t0), the signal processing circuit 61 may output corresponding drive determining signals (low-level NAC and high-level PAC), and the control circuit 62 may generate drive control signals based on the drive determining signals, and output a high-level drive control signal PWM_IN4 to turn on the second lower bridge arm 5032, so that the second power supply drive circuit 504 is charged. In addition, the control circuit 62 may also keep a drive control signal PWM_IN3 at a low level to turn off the second upper bridge arm 5031. When the charging duration of the second power supply drive circuit 504 reaches the second target duration (that is, charging duration Δt1≥second target duration Th2 at a moment t1), the control circuit 62 may generate drive control signals, and output a low-level drive control signal PWM_IN4 to turn off the second lower bridge arm 5032. In addition, when the signal processing circuit 61 determines that the voltage of the first connection end of the alternating current power supply 51 changes to being less than the voltage of the second connection end of the alternating current power supply 51 (that is, at a moment t2), the signal processing circuit 61 may output corresponding drive determining signals (high-level NAC and low-level PAC), and the control circuit 62 may generate drive control signals based on the drive determining signals, and output a high-level drive control signal PWM_IN2 to turn on a first lower bridge arm 5022, so that the first power supply drive circuit 501 is charged. In addition, the control circuit 62 may also keep a drive control signal PWM_IN1 at a low level to turn off a first upper bridge arm 5021. When charging duration of the first power supply drive circuit 501 reaches first target duration (that is, charging duration Δt2≥first target duration Th1 at a moment t3), the control circuit 62 may generate drive control signals, and output a low-level drive control signal PWM_IN2 to turn off the first lower bridge arm 5022, to complete charging of the first power supply drive circuit 501 and the second power supply drive circuit 504. The control circuit 62 may generate drive control signals, to alternately turn on the first upper bridge arm, the first lower bridge arm, the second upper bridge arm, and the second lower bridge arm to supply power to the load 53. For clarity of description, a state signal STATE for describing a power supply system is added. From left to right, when the STATE signal is kept at a low level, the PFC circuit is in a standby state; when the STATE signal jumps from the low level to a high level, the PFC circuit is in the pre-start state; when the STATE signal is kept at the high level, the PFC circuit is in a precharging state; when the STATE signal jumps from the high level to the low level, the PFC circuit completes bootstrap charging; and when the STATE signal jumps from the high level to the low level and is kept at the low level, the PFC circuit normally works.

It may be understood that a process of first charging the second power supply drive circuit 504 and then charging the first power supply drive circuit 501 is similar to a process of first charging the first power supply drive circuit 501 and then charging a second power supply drive circuit 504 in FIG. 6b. Details are not described herein again.

Figure 9B:
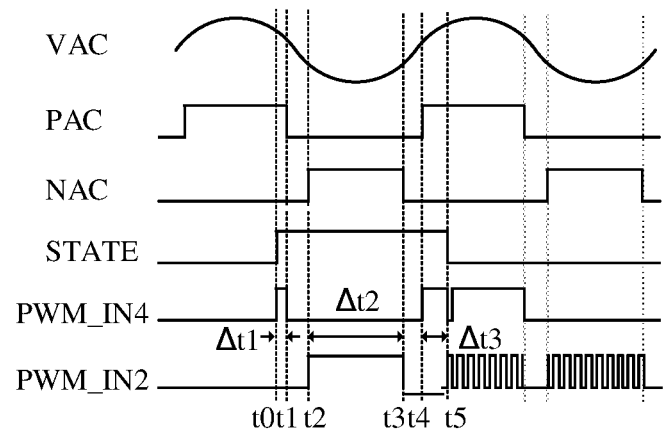
FIG. 9b is a schematic diagram of another control waveform of a sampling control circuit according to an embodiment.

In some feasible implementations, refer to FIG. 9b together. FIG. 9b is a schematic diagram of another control waveform of a sampling control circuit according to an embodiment. As shown in FIG. 9b, the sampling control circuit 52 may be further configured to: when the voltage of the first connection end of the alternating current power supply 51 changes from being greater than the voltage of the second connection end of the alternating current power supply 51 to being less than or equal to the voltage of the second connection end of the alternating current power supply 51, and the charging time of the second power supply drive circuit 504 is less than the second target duration, control the second lower bridge arm 5052 to be turned off; when the voltage of the first connection end of the alternating current power supply 51 changes to being less than or equal to the voltage of the second connection end of the alternating current power supply 51, control a first lower bridge arm 5022 to be turned on, so that charging time of a first power supply drive circuit 501 reaches first target duration; and when the voltage of the first connection end of the alternating current power supply 51 changes from being less than or equal to the voltage of the second connection end of the alternating current power supply 51 to being greater than the voltage of the second connection end of the alternating current power supply 51, control the second lower bridge arm 5052 to be turned on, so that the charging time of the second power supply drive circuit 504 reaches the second target duration.

For example, when determining that the voltage of the first connection end of the alternating current power supply 51 is greater than the voltage of the second connection end of the alternating current power supply 51 (that is, at a moment t0), the signal processing circuit 61 may output corresponding drive determining signals (low-level NAC and high-level PAC), and the control circuit 62 may generate drive control signals based on the drive determining signals, and output a high-level drive control signal PWM_IN4 to turn on the second lower bridge arm 5032, so that the second power supply drive circuit 504 is charged. In addition, the control circuit 62 may also keep a drive control signal PWM_IN3 at a low level to turn off the second upper bridge arm 5031. When determining that the voltage of the first connection end of the alternating current power supply 51 changes from being greater than the voltage of the second connection end of the alternating current power supply 51 to being less than or equal to the voltage of the second connection end of the alternating current power supply 51 (that is, at a moment t1), and the charging duration of the second power supply drive circuit 504 is less than the second target duration (that is, charging duration Δt1<second target duration Th2 at the moment t1), the control circuit 62 may generate drive control signals, and output a low-level drive control signal PWM_IN4 to turn off the second lower bridge arm 5032. In addition, when the signal processing circuit 61 determines that the voltage of the first connection end of the alternating current power supply 51 changes to being less than the voltage of the second connection end of the alternating current power supply 51 (that is, at a moment t2), the signal processing circuit 61 may output corresponding drive determining signals (high-level NAC and low-level PAC), and the control circuit 62 may generate drive control signals based on the drive determining signals, and output a high-level drive control signal PWM_IN2 to turn on the first lower bridge arm 5022, so that the first power supply drive circuit 501 is charged. In addition, the control circuit 62 may also keep a drive control signal PWM_IN1 at a low level to turn off a first upper bridge arm 5021. When the charging duration of the first power supply drive circuit 501 reaches the first target duration (that is, charging duration Δt2≥first target duration Th1 at a moment t3), the control circuit 62 may generate drive control signals, and output a low-level drive control signal PWM_IN2 to turn off the first lower bridge arm 5022. In addition, when the signal processing circuit 61 determines that the voltage of the first connection end of the alternating current power supply 51 changes to being greater than the voltage of the second connection end of the alternating current power supply 51 (that is, at a moment t4), the signal processing circuit 61 may output corresponding drive determining signals (low-level NAC and high-level PAC), and the control circuit 62 may generate drive control signals based on the drive determining signals, and output a high-level drive control signal PWM_IN4 to turn on the second lower bridge arm 5032, so that the second power supply drive circuit 504 is charged. In addition, the control circuit 62 may also keep a drive control signal PWM_IN3 at a low level to turn off the second upper bridge arm 5031. When the charging duration of the second power supply drive circuit 504 reaches the second target duration (that is, charging duration $\Delta t3 \geq$ second target duration Th2 at a moment t5), the control circuit 62 may generate drive control signals, and output a low-level drive control signal PWM_IN4 to turn off the second lower bridge arm 5032, to complete charging of the first power supply drive circuit 501 and the second power supply drive circuit 504.

The control circuit 62 may generate drive control signals, to alternately turn on the first upper bridge arm, the first lower bridge arm, the second upper bridge arm, and the second lower bridge arm to supply power to the load 53. For clarity of description, a state signal STATE for describing a power supply system is added. From left to right, when the STATE signal is kept at a low level, the PFC circuit is in a standby state; when the STATE signal jumps from the low level to a high level, the PFC circuit is in the pre-start state; when the STATE signal is kept at the high level, the PFC circuit is in a precharging state; when the STATE signal jumps from the high level to the low level, the PFC circuit completes bootstrap charging; and when the STATE signal jumps from the high level to the low level and is kept at the low level, the PFC circuit normally works.

It may be understood that, a process of first charging the second power supply drive circuit 504 and then charging the first power supply drive circuit 501 when the charging duration of the first power supply drive circuit 501 is less than the first target duration is similar to the process of first charging the first power supply drive circuit 501 and then charging the second power supply drive circuit 504 when the charging duration of the second power supply drive circuit 504 is less than the second target duration in FIG. 9b, and details are not described herein.

In the implementation, when the voltages of the two ends of the alternating current power supply 51 do not meet a charging condition of a target power supply drive circuit, and the target power supply drive circuit does not complete charging, the sampling control circuit 52 may control a target lower bridge arm connected to the target power supply drive circuit to be turned off; when the voltages of the two ends of the alternating current power supply 51 meet a charging condition of another power supply drive circuit, turn on another lower bridge arm, so that the another power supply drive circuit completes charging; and when the voltages of the two ends of the alternating current power supply 51 meet the charging condition of the target power supply drive circuit 501 again, control the target lower bridge arm to be turned on, so that charging time of the target power supply drive circuit reaches target duration (in other words, the target power supply drive circuit completes charging). The operation is simple, and applicability is strong, so that when the target power supply drive circuit does not complete charging, the another power supply drive circuit may be first enabled to complete charging, and then the target power supply drive circuit is enabled to complete charging, thereby further improving electric energy utilization, and prolonging a service life of a circuit element.

Figure 10:
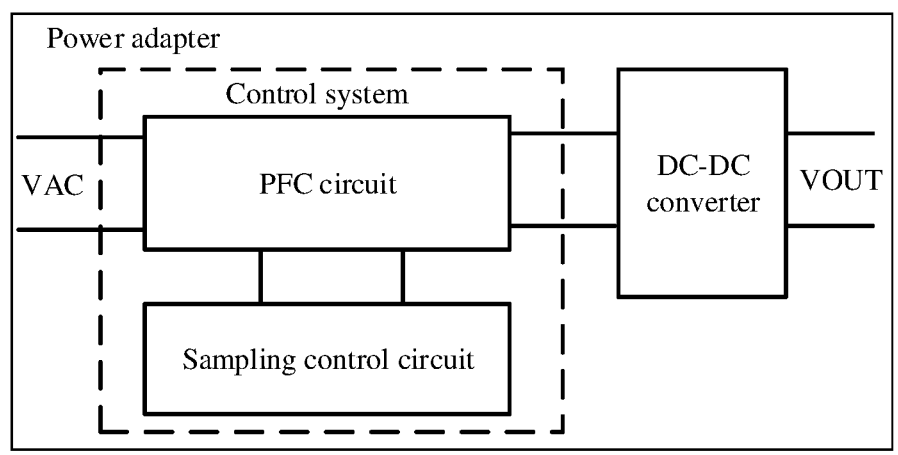
FIG. 10 is a schematic diagram of a structure of a power adapter according to an embodiment.

FIG. 10 is a schematic diagram of a structure of a power adapter according to an embodiment. As shown in FIG. 10, the power adapter includes the control system and a DC-DC converter. An input end of the control system is connected to an alternating current power supply VAC (that is, a first bridge arm midpoint in a PFC circuit is connected to a first connection end of the alternating current power supply by using an inductor, and a second bridge arm midpoint in the PFC circuit is connected to a second connection end of the alternating current power supply), and an output end of the control system is connected to the DC-DC converter as an output end of the power adapter. The power adapter may precharge a power supply drive circuit when a sampling control circuit in the control system detects that values of voltages of the two ends of the alternating current power supply meet a precharging condition of the power supply drive circuit in the control system, so that during working, the control system can convert a voltage of the alternating current power supply into a direct current voltage and output the direct current voltage to the DC-DC converter, thereby improving electric energy utilization, and prolonging a service life of a circuit element.

Figure 11:
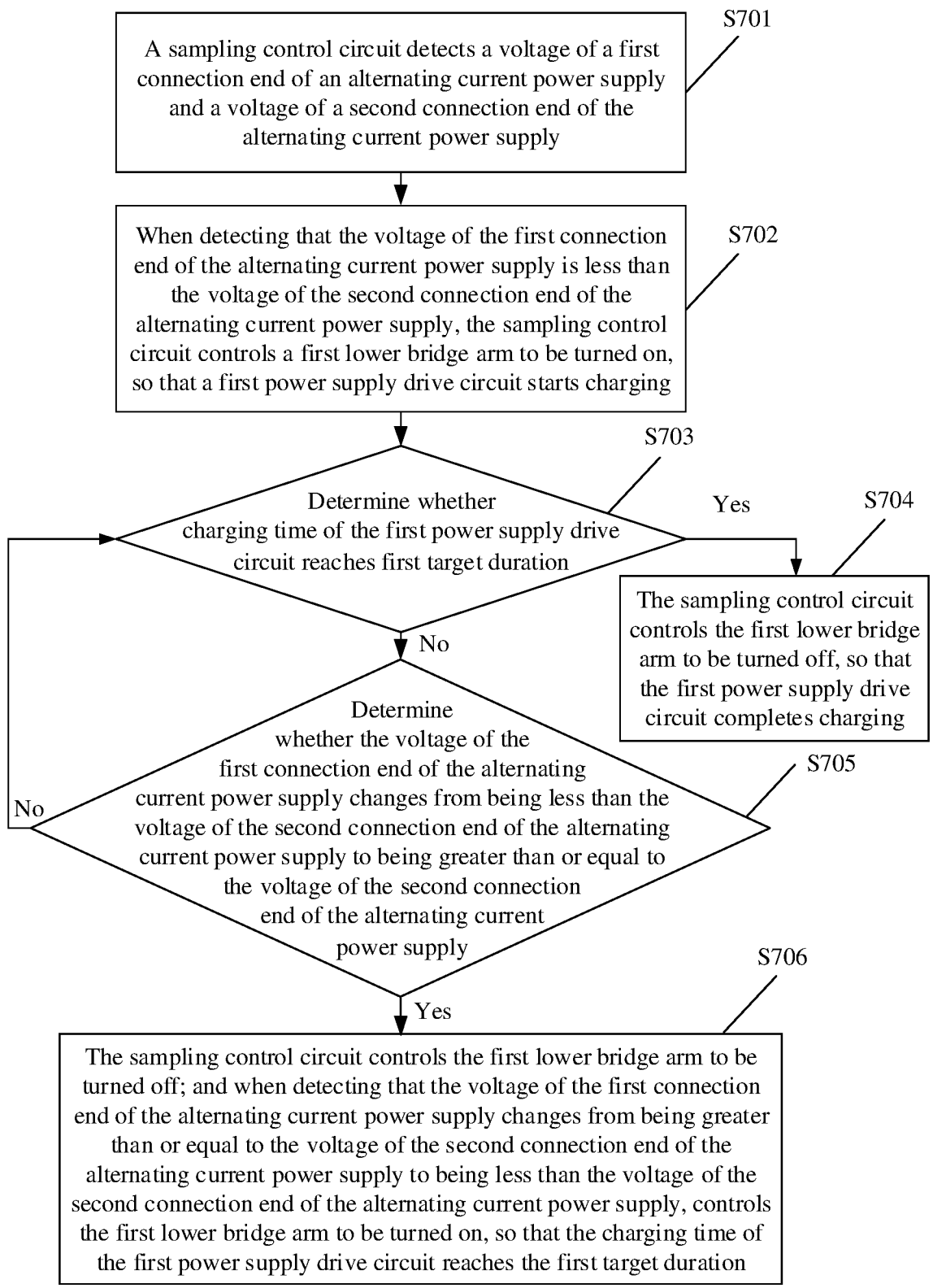
FIG. 11 is a schematic flowchart of a control method according to an embodiment.

FIG. 11 is a schematic flowchart of a control method according to an embodiment. As shown in FIG. 11, the control method is applicable to the control system shown in any one of FIG. 2 to FIG. 9b. The control method includes the following steps:

S701. A sampling control circuit detects a voltage of a first connection end of an alternating current power supply and a voltage of a second connection end of the alternating current power supply.

S702. When detecting that the voltage of the first connection end of the alternating current power supply is less than the voltage of the second connection end of the alternating current power supply, the sampling control circuit controls a first lower bridge arm to be turned on, so that a first power supply drive circuit starts charging.

In some feasible implementations, the sampling control circuit may collect the voltages of the two ends of the alternating current power supply by using a signal processing circuit, and generate corresponding drive determining signals based on the voltages of the two ends of the alternating current power supply; and the sampling control circuit may generate drive control signals based on the drive determining signals by using a control circuit, and control, by using the drive control signals, a power supply drive circuit to turn on and/or turn off a corresponding bridge arm, where the power supply drive circuit includes the first power supply drive circuit, a second power supply drive circuit, and/or a third power supply drive circuit. Herein, the signal processing circuit may detect the voltages of the two ends of the alternating current power supply. When the control system is in a pre-start state (for example, a load accesses the control system, a standby level in the control system is lowered, or a pre-start signal is detected before a PFC circuit normally supplies power to the load), the signal processing circuit may determine values of the voltages of the two ends of the alternating current power supply. The signal processing circuit may output the corresponding drive determining signals by determining the values of the voltages of the two ends of the alternating current power supply.

In some feasible implementations, when detecting that the voltage of the first connection end of the alternating current power supply is less than the voltage of the second connection end of the alternating current power supply, the sampling control circuit may control the first lower bridge arm to be turned on, so that the first power supply drive circuit starts charging. It may be understood that when the sampling control circuit determines that the voltage of the first connection end of the alternating current power supply is less than the voltage of the second connection end of the alternating current power supply, the sampling control circuit may output a corresponding drive control signal (that is, output a high-level drive control signal PWM_IN2) to provide an on-state voltage for the first lower bridge arm to turn on the first lower bridge arm. In this case, because the first lower bridge arm is turned on and grounded, the first lower bridge arm and the first power supply drive circuit form a path, so that the first power supply drive circuit can charge a bootstrap charging element (for example, a bootstrap capacitor C1) in the first power supply drive circuit by using a power supply (that may be an external power supply or an internal power supply), to implement bootstrap charging of the first power supply drive circuit.

S703. Determine whether charging time of the first power supply drive circuit reaches first target duration; and if determining that the charging time of the first power supply drive circuit reaches the first target duration, continue to perform step S704; otherwise, perform step S705.

S704. The sampling control circuit controls the first lower bridge arm to be turned off, so that the first power supply drive circuit completes charging.

In some feasible implementations, when the charging duration of the first power supply drive circuit reaches the first target duration, the sampling control circuit may control the first lower bridge arm to be turned off and control the first power supply drive circuit to turn on a first upper bridge arm. Herein, that the charging duration of the first power supply drive circuit reaches the first target duration indicates that the first power supply drive circuit (namely, the bootstrap charging element in the first power supply drive circuit) completes charging. That is, when the first power supply drive circuit (namely, the bootstrap charging element in the first power supply drive circuit) completes charging, the sampling control circuit may output a corresponding drive control signal (that is, output a low-level drive control signal PWM_IN2) to turn off the first lower bridge arm.

In some feasible implementations, after the first power supply drive circuit (namely, the bootstrap charging element in the first power supply drive circuit) completes charging, the sampling control circuit may output a corresponding drive control signal (output a high-level drive control signal PWM_IN1) to drive the first power supply drive circuit, so that the first power supply drive circuit generates a drive voltage greater than or equal to an on-state voltage of the first upper bridge arm, to turn on the first upper bridge arm.

S705. Determine whether the voltage of the first connection end of the alternating current power supply changes from being less than the voltage of the second connection end of the alternating current power supply to being greater than or equal to the voltage of the second connection end of the alternating current power supply; and if determining that the voltage of the first connection end of the alternating current power supply changes from being less than the voltage of the second connection end of the alternating current power supply to being greater than or equal to the voltage of the second connection end of the alternating current power supply, continue to perform step S706; otherwise, perform step S703.

S706. The sampling control circuit controls the first lower bridge arm to be turned off; and when detecting that the voltage of the first connection end of the alternating current power supply changes from being greater than or equal to the voltage of the second connection end of the alternating current power supply to being less than the voltage of the second connection end of the alternating current power supply, controls the first lower bridge arm to be turned on, so that the charging time of the first power supply drive circuit reaches the first target duration.

In some feasible implementations, when detecting that the voltage of the first connection end of the alternating current power supply changes from being less than the voltage of the second connection end of the alternating current power supply to being greater than or equal to the voltage of the second connection end of the alternating current power supply, and the charging time of the first power supply drive circuit is less than the first target duration, the sampling control circuit may control the first lower bridge arm to be turned off; and when detecting that the voltage of the first connection end of the alternating current power supply changes from being greater than or equal to the voltage of the second connection end of the alternating current power supply to being less than the voltage of the second connection end of the alternating current power supply, control the first lower bridge arm to be turned on, so that the charging time of the first power supply drive circuit reaches the first target duration. Herein, when the sampling circuit determines that the voltage of the first connection end of the alternating current power supply is less than the voltage of the second connection end of the alternating current power supply, the sampling control circuit may output the corresponding drive control signal (that is, output the high-level drive control signal PWM_IN2) to turn on the first lower bridge arm, so that the first power supply drive circuit starts charging. That is, from a moment at which the first power supply drive circuit starts charging to a moment at which the voltage of the first connection end of the alternating current power supply changes to being greater than or equal to the voltage of the second connection end of the alternating current power supply, the charging duration of the first power supply drive circuit may be less than the first target duration, that is, the first power supply drive circuit (namely, the bootstrap charging element (namely, the bootstrap capacitor C1)) does not complete charging. It may be understood that, in this case, even if the sampling control circuit outputs a corresponding drive control signal (that is, outputs a high-level drive control signal PWM_IN1) to the first power supply drive circuit, the first power supply drive circuit cannot provide an on-state voltage for the first upper bridge arm to turn on the first upper bridge arm. In this case, the sampling control circuit may first control the first lower bridge arm to be turned off (that is, output a low-level drive control signal PWM_IN2); and when the voltage of the first connection end of the alternating current power supply changes from being greater than or equal to the voltage of the second connection end of the alternating current power supply to being less than the voltage of the second connection end of the alternating current power supply (that is, when a charging start condition of the first power supply drive circuit is met again), control the first lower bridge arm to be turned on, so that the charging time of the first power supply drive circuit reaches the first target duration.

In the implementation, the first power supply drive circuit (namely, the bootstrap charging element (namely, the bootstrap capacitor C1)) in the PFC circuit may be precharged only when necessary (that is, when the PFC circuit is in a pre-start state), to reduce an electric energy loss in a process of charging the first power supply drive circuit (namely, the bootstrap charging element (namely, the bootstrap capacitor C1)), thereby improving electric energy utilization, and prolonging a service life of a circuit element. The sampling control circuit may compare a value of the voltage of the first connection end of the alternating current power supply with a value of the voltage of the second connection end of the alternating current power supply, to simply determine when to start to output a drive control signal, so that the first power supply drive circuit starts charging. The operation is simple, and applicability is strong, so that electric energy utilization can be further improved, and a service life of a circuit element can be further prolonged. In addition, when the voltages of the two ends of the alternating current power supply do not meet a charging condition of the first power supply drive circuit (that is, the voltage of the first connection end of the alternating current power supply changes from being less than the voltage of the second connection end of the alternating current power supply to being greater than or equal to the voltage of the second connection end of the alternating current power supply), and the first power supply drive circuit does not complete charging, the sampling control circuit may control the first lower bridge arm to be turned off; and when the voltages of the two ends of the alternating current power supply meet the charging condition of the first power supply drive circuit again (that is, the voltage of the first connection end of the alternating current power supply changes from being greater than or equal to the voltage of the second connection end of the alternating current power supply to being less than the voltage of the second connection end of the alternating current power supply), control the first lower bridge arm to be turned on, so that the charging time of the first power supply drive circuit reaches the first target duration (in other words, the first power supply drive circuit completes charging). The operation is simple, and applicability is strong, so that on a basis of ensuring that the first power supply drive circuit completes charging, electric energy utilization can be further improved, and a service life of a circuit element can be further prolonged.

It may be understood that when the control system includes a second power supply drive circuit, a control method in which the control system charges the second power supply drive circuit or the second power supply drive circuit and the first power supply drive circuit is similar to the working principle of the control system described in FIG. 7 to FIG. 9b, and details are not described herein.

The foregoing descriptions are merely implementations, but are not intended as limiting. Any variation or replacement readily figured out by a person skilled in the art is envisioned to be within the scope of the embodiments.

What is claimed is:

1. A control system for controlling a totem pole power factor correction circuit, the control system comprising:
    a sampling control circuit; and
    a power factor correction (PFC) circuit that comprises:
        an inductor,
        a first power supply drive circuit,
        a first bridge arm and a second bridge arm that are connected in parallel,
        a first parallel connection point between the first bridge arm and the second bridge arm that is connected to a load,
        a second parallel connection point between the first bridge arm and the second bridge arm that is grounded,
        a first bridge arm midpoint of the first bridge arm that is connected to a first connection end of an alternating current power supply by using the inductor, wherein the first bridge arm midpoint is a serial connection point between a first upper bridge arm and a first lower bridge arm of the first bridge arm, one end of the sampling control circuit is connected to the alternating current power supply, another end of the sampling control circuit is connected to the first lower bridge arm, a first connection end of the first power supply drive circuit is connected to the first upper bridge arm, and a second connection end of the first power supply drive circuit is connected to the first bridge arm midpoint,
        a second connection end of the alternating current power supply that is connected to a second bridge arm midpoint of the second bridge arm, and
    the sampling control circuit is configured to:
    control, based on voltages of the two ends of the alternating current power supply, the first lower bridge arm to be turned on, so that the first power supply drive circuit starts charging, and
    when a charging duration of the first power supply drive circuit reaches a first target duration, control the first lower bridge arm to be turned off, so that the first power supply drive circuit completes charging.

2. The control system according to claim 1, wherein the sampling control circuit is further configured to:
    when a voltage of the first connection end of the alternating current power supply is less than a voltage of the second connection end of the alternating current power supply, control the first lower bridge arm to be turned on, so that the first power supply drive circuit starts charging.

3. The control system according to claim 2, wherein the sampling control circuit is further configured to:
    when the voltage of the first connection end of the alternating current power supply changes from being less than the voltage of the second connection end of the alternating current power supply to being greater than or equal to the voltage of the second connection end of the alternating current power supply, and the charging time of the first power supply drive circuit is less than the first target duration, control the first lower bridge arm to be turned off; and
    when the voltage of the first connection end of the alternating current power supply changes from being greater than or equal to the voltage of the second connection end of the alternating current power supply to being less than the voltage of the second connection end of the alternating current power supply, control the first lower bridge arm to be turned on, so that the charging time of the first power supply drive circuit reaches the first target duration.

4. The control system according to claim 1, wherein the other end of the sampling control circuit is further connected to the first power supply drive circuit; and the sampling control circuit is further configured to:
    after the first power supply drive circuit completes charging, control the first power supply drive circuit to turn on the first upper bridge arm.

5. The control system according to claim 1, wherein the PFC circuit further comprises:
- a second power supply drive circuit, the second bridge arm comprises a second upper bridge arm and a second lower bridge arm, the second bridge arm midpoint is a serial connection point between the second upper bridge arm and the second lower bridge arm of the second bridge arm, the other end of the sampling control circuit is connected to the second lower bridge arm, a first connection end of the second power supply drive circuit is connected to the second upper bridge arm, and a second connection end of the second power supply drive circuit is connected to the second bridge arm midpoint;
- the sampling control circuit is further configured to:
- control, based on the voltages of the two ends of the alternating current power supply, the second lower bridge arm to be turned on, so that the second power supply drive circuit starts charging, and
- when charging duration of the second power supply drive circuit reaches second target duration, control the second lower bridge arm to be turned off, so that the second power supply drive circuit completes charging.

6. The control system according to claim 5, wherein the sampling control circuit is further configured to:
- when the voltage of the first connection end of the alternating current power supply is greater than the voltage of the second connection end of the alternating current power supply, control the second lower bridge arm to be turned on, so that the second power supply drive circuit starts charging.

7. The control system according to claim 6, wherein the sampling control circuit is further configured to:
- when the voltage of the first connection end of the alternating current power supply changes from being greater than the voltage of the second connection end of the alternating current power supply to being less than or equal to the voltage of the second connection end of the alternating current power supply, and the charging time of the second power supply drive circuit is less than the second target duration, control the second lower bridge arm to be turned off; and
- when the voltage of the first connection end of the alternating current power supply changes from being less than or equal to the voltage of the second connection end of the alternating current power supply to being greater than the voltage of the second connection end of the alternating current power supply,
- control the second lower bridge arm to be turned on, so that the charging time of the second power supply drive circuit reaches the second target duration.

8. The control system according to claim 5, wherein the other end of the sampling control circuit is further connected to the second power supply drive circuit; and
- the sampling control circuit is further configured to:
- after the second power supply drive circuit completes charging, control the second power supply drive circuit to turn on the second upper bridge arm.

9. The control system according to claim 1, wherein each of the first power supply drive circuit and/or the second power supply drive circuit is a bootstrap power supply drive circuit, and the bootstrap power supply drive circuit comprises a bootstrap capacitor, a bootstrap diode, and a drive circuit; one end of the bootstrap capacitor is separately connected to an output end of the bootstrap diode and a first connection end of the drive circuit, the other end of the bootstrap capacitor is separately connected to a second connection end of the drive circuit and a bridge arm midpoint, an input end of the bootstrap diode is connected to a power supply, a third connection end of the drive circuit is connected to the sampling control circuit, and a fourth connection end of the drive circuit is connected to an upper bridge arm; the power supply is configured to:
- when the sampling control circuit controls a lower bridge arm connected to the upper bridge arm in series to be turned on, charge the bootstrap capacitor to implement charging of the power supply drive circuit;
- the sampling control circuit is further configured to:
- when charging duration of the bootstrap capacitor reaches target duration, control the lower bridge arm to be turned off to complete charging of the power supply drive circuit, wherein the target duration is the first target duration or the second target duration; and
- after the power supply drive circuit completes charging, control the power supply drive circuit to turn on the upper bridge arm.

10. The control system according to claim 9, wherein the PFC circuit further comprises a third power supply drive circuit, one end of the third power supply drive circuit is connected to the sampling control circuit, and the other end of the third power supply drive circuit is connected to the first lower bridge arm or the second lower bridge arm; and
- the sampling control circuit is configured to:
- control, based on the voltages of the two ends of the alternating current power supply, the third power supply drive circuit to turn on the first lower bridge arm or the second lower bridge arm.

11. The control system according to claim 10, wherein the sampling control circuit comprises:
- a signal processing circuit; and
- a control circuit; one end of the signal processing circuit is used as one end of the sampling control circuit to be separately connected to the first connection end of the alternating current power supply and the second connection end of the alternating current power supply, the other end of the signal processing circuit is connected to the control circuit, and the other end of the control circuit is used as an output of the sampling control circuit to be connected to a power supply drive circuit;
- the signal processing circuit is configured to:
- collect the voltages of the two ends of the alternating current power supply, and generate corresponding drive determining signals based on the voltages of the two ends of the alternating current power supply; and
- the control circuit is configured to:
- generate drive control signals based on the drive determining signals, and control, by using the drive control signals, the power supply drive circuit to turn on and/or turn off a corresponding bridge arm, wherein the power supply drive circuit comprises the first power supply drive circuit, the second power supply drive circuit, and/or the third power supply drive circuit.

12. A method for controlling a totem pole power factor correction circuit, wherein the control method is applicable to a sampling control circuit in a control system, wherein the control system comprises a power factor correction PFC circuit and a sampling control circuit, the PFC circuit comprises an inductor, a first power supply drive circuit, and a first bridge arm and a second bridge arm that are connected in parallel, a first parallel connection point between the first bridge arm and the second bridge arm is connected to a load, a second parallel connection point between the first bridge arm and the second bridge arm is grounded, a first bridge arm midpoint of the first bridge arm is connected to a first connection end of an alternating current power supply by using the inductor, a second connection end of the alternating current power supply is connected to a second bridge arm midpoint of the second bridge arm, the first bridge arm midpoint is a serial connection point between a first upper bridge arm and a first lower bridge arm of the first bridge arm, one end of the sampling control circuit is connected to the alternating current power supply, the other end of the sampling control circuit is connected to the first lower bridge arm, a first connection end of the first power supply drive circuit is connected to the first upper bridge arm, and a second connection end of the first power supply drive circuit is connected to the first bridge arm midpoint;

and the method comprises:
controlling, by the sampling control circuit based on voltages of two ends of an alternating current power supply, a first lower bridge arm to be turned on, so that a first power supply drive circuit starts charging; and
when a charging duration of the first power supply drive circuit reaches a first target duration, controlling, by the sampling control circuit, the first lower bridge arm to be turned off, so that the first power supply drive circuit completes charging.

13. The method according to claim 12, further comprising:
detecting, by the sampling control circuit, a voltage of a first connection end of the alternating current power supply and a voltage of a second connection end of the alternating current power supply; and
when detecting that the voltage of the first connection end of the alternating current power supply is less than the voltage of the second connection end of the alternating current power supply, controlling, by the sampling control circuit, the first lower bridge arm to be turned on, so that the first power supply drive circuit starts charging.

14. The method according to claim 13, wherein after the controlling, by the sampling control circuit, the first lower bridge arm to be turned on, the method further comprises:
when detecting that the voltage of the first connection end of the alternating current power supply changes from being less than the voltage of the second connection end of the alternating current power supply to being greater than or equal to the voltage of the second connection end of the alternating current power supply, and the charging time of the first power supply drive circuit is less than the first target duration, controlling, by the sampling control circuit, the first lower bridge arm to be turned off; and when detecting that the voltage of the first connection end of the alternating current power supply changes from being greater than or equal to the voltage of the second connection end of the alternating current power supply to being less than the voltage of the second connection end of the alternating current power supply, controlling the first lower bridge arm to be turned on, so that the charging time of the first power supply drive circuit reaches the first target duration.

15. The method according to claim 12, wherein after the first power supply drive circuit completes charging, the method further comprises:
controlling, by the sampling control circuit, the first power supply drive circuit to turn on a first upper bridge arm.

16. The method according to claim 12, wherein the method further comprises:

controlling, by the sampling control circuit based on the voltages of the two ends of the alternating current power supply, a second lower bridge arm to be turned on, so that a second power supply drive circuit starts charging; and
when charging duration of the second power supply drive circuit reaches second target duration, controlling, by the sampling control circuit, the second lower bridge arm to be turned off, so that the second power supply drive circuit completes charging.

17. The method according to claim 16, wherein the controlling, by the sampling control circuit based on the voltages of the two ends of the alternating current power supply, a second lower bridge arm to be turned on comprises:
when detecting that the voltage of the first connection end of the alternating current power supply is greater than the voltage of the second connection end of the alternating current power supply, controlling, by the sampling control circuit, the second lower bridge arm to be turned on, so that the second power supply drive circuit starts charging.

18. The method according to claim 17, wherein after the controlling, by the sampling control circuit, the second lower bridge arm to be turned on, the method further comprises:
when detecting that the voltage of the first connection end of the alternating current power supply changes from being greater than the voltage of the second connection end of the alternating current power supply to being less than or equal to the voltage of the second connection end of the alternating current power supply, and the charging time of the second power supply drive circuit is less than the second target duration, controlling, by the sampling control circuit, the second lower bridge arm to be turned off; and when detecting that the voltage of the first connection end of the alternating current power supply changes from being less than or equal to the voltage of the second connection end of the alternating current power supply to being greater than the voltage of the second connection end of the alternating current power supply, controlling the second lower bridge arm to be turned on, so that the charging time of the second power supply drive circuit reaches the second target duration.

19. The method according to claim 12, wherein after the second power supply drive circuit completes charging, the method further comprises:
controlling, by the sampling control circuit, the second power supply drive circuit to turn on a second upper bridge arm.

20. A power adapter, wherein the power adapter comprises
a direct current DC-DC converter; and
a control system that comprises
a sampling control circuit, and
a power factor correction (PFC) circuit that comprises
an inductor,
a first power supply drive circuit,
a first bridge arm and a second bridge arm that are connected in parallel,
a first parallel connection point between the first bridge arm and the second bridge arm that is connected to a load,
a second parallel connection point between the first bridge arm and the second bridge arm that is grounded, a first bridge arm midpoint of the first bridge arm that is connected to a first connection end of an alternating current power supply by using the inductor, a second connection end of the alternating current power supply that is connected to a second bridge arm midpoint of the second bridge arm, the first bridge arm midpoint is a serial connection point between a first upper bridge arm and a first lower bridge arm of the first bridge arm, one end of the sampling control circuit is connected to the alternating current power supply, the other end of the sampling control circuit is connected to the first lower bridge arm, a first connection end of the first power supply drive circuit is connected to the first upper bridge arm, and a second connection end of the first power supply drive circuit is connected to the first bridge arm midpoint;

the sampling control circuit is configured to:

control, based on voltages of the two ends of the alternating current power supply, the first lower bridge arm to be turned on, so that the first power supply drive circuit starts charging; and when charging duration of the first power supply drive circuit reaches first target duration, control the first lower bridge arm to be turned off, so that the first power supply drive circuit completes charging; and an input end of the control system is connected to an alternating current power supply, and an output end of the control system is connected to an output end of the power adapter by using the DC-DC converter.

* * * * *